(12) United States Patent
Khamatnurova et al.

(10) Patent No.: US 11,279,801 B2
(45) Date of Patent: Mar. 22, 2022

(54) SILANE-FUNCTIONALIZED POLYALKYLENEIMINE CLAY STABILIZER FOR TREATMENT OF SUBTERRANEAN FORMATIONS

(71) Applicant: Halliburton Energy Services, Inc., Houston, TX (US)

(72) Inventors: Tatyana V. Khamatnurova, Houston, TX (US); Gladys Rocio Montenegro-Galindo, Kingwood, TX (US); Denise Nicole Benoit, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 139 days.

(21) Appl. No.: 15/762,068

(22) PCT Filed: Oct. 16, 2015

(86) PCT No.: PCT/US2015/055990
§ 371 (c)(1),
(2) Date: Mar. 21, 2018

(87) PCT Pub. No.: WO2017/065804
PCT Pub. Date: Apr. 20, 2017

(65) Prior Publication Data
US 2018/0265635 A1   Sep. 20, 2018

(51) Int. Cl.
| | |
|---|---|
| *C09K 8/035* | (2006.01) |
| *C09K 8/80* | (2006.01) |
| *C09K 8/467* | (2006.01) |
| *C09K 8/60* | (2006.01) |
| *C09K 8/64* | (2006.01) |
| *C09K 8/68* | (2006.01) |
| *C09K 8/72* | (2006.01) |
| *C09K 8/74* | (2006.01) |
| *C09K 8/82* | (2006.01) |
| *C09K 8/88* | (2006.01) |
| *C08G 73/02* | (2006.01) |
| *C09K 8/52* | (2006.01) |
| *E21B 41/00* | (2006.01) |

(52) U.S. Cl.
CPC .......... *C08G 73/0213* (2013.01); *C09K 8/035* (2013.01); *C09K 8/467* (2013.01); *C09K 8/52* (2013.01); *C09K 8/608* (2013.01); *C09K 8/64* (2013.01); *C09K 8/68* (2013.01); *C09K 8/725* (2013.01); *C09K 8/74* (2013.01); *C09K 8/80* (2013.01); *C09K 8/82* (2013.01); *C09K 8/885* (2013.01); *E21B 41/00* (2013.01); *C09K 2208/08* (2013.01); *C09K 2208/24* (2013.01); *C09K 2208/26* (2013.01)

(58) Field of Classification Search
CPC ... C09K 8/04; C09K 8/14; C09K 8/22; C09K 8/24; C09K 8/608; C09K 8/725
See application file for complete search history.

(56) References Cited

U.S. PATENT DOCUMENTS

| | | | |
|---|---|---|---|
| 7,964,415 B2 | 6/2011 | Zhelev et al. | |
| 2008/0132711 A1 | 6/2008 | Poelker et al. | |
| 2008/0302570 A1 | 12/2008 | deBoer | |
| 2009/0065207 A1 | 3/2009 | Shenoy et al. | |
| 2010/0089579 A1* | 4/2010 | Reyes | G01N 15/00 166/280.1 |
| 2013/0310284 A1 | 11/2013 | Weaver et al. | |
| 2014/0190700 A1 | 7/2014 | Tang et al. | |
| 2016/0108253 A1* | 4/2016 | Song | C09D 5/1625 423/111 |

OTHER PUBLICATIONS

International Search Report and Written Opinion of PCT Application No. PCT/US2015/055990 dated Aug. 5, 2016: pp. 1-13.

* cited by examiner

*Primary Examiner* — Aiqun Li
(74) *Attorney, Agent, or Firm* — Chamberlain Hrdlicka

(57) ABSTRACT

Various embodiments disclosed relate to a silane-functionalized polyalkyleneimine (PAI) clay stabilizer for treatment of subterranean formations. In various embodiments, the present invention provides a method of treating a subterranean formation. The method can include placing in the subterranean formation a silane-functionalized PAI clay stabilizer.

11 Claims, 5 Drawing Sheets

SILANE-FUNCTIONALIZED POLYALKYLENEIMINE CLAY STABILIZER FOR TREATMENT OF SUBTERRANEAN FORMATIONS

BACKGROUND

Swelling clays can be a major mechanism of formation damage due to loss of mobility of hydrocarbon fluids in the formation. When clays encounter foreign water, such as well-treatment fluids or produced water, they can swell, causing a loss of permeability. The swelling can cause portions of the clay and adjacent fines to become mobile within the production stream and, too frequently, encounter constrictions in capillaries, where they can bridge off the capillaries and severely diminish the flow rate of hydrocarbons to the wellbore. Sometimes the loss of permeability observed is due to clay swelling without migration, but often clay swelling is accompanied by migration of clay and other fines. Non-swelling clays may also respond to the foreign water and begin to migrate.

Stabilization of formation materials against the swelling and migration of clay and the generation of fines is necessary in subterranean treatments such as hydraulic fracturing, gravel packing, and any activity where aqueous fluid comes in contact with water-sensitive clay-containing formation materials. However, many clay stabilizers are expensive, less effective than desirable, environmentally undesirable due to toxicity or lack of biodegradability, and can cause damage to subterranean formations.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
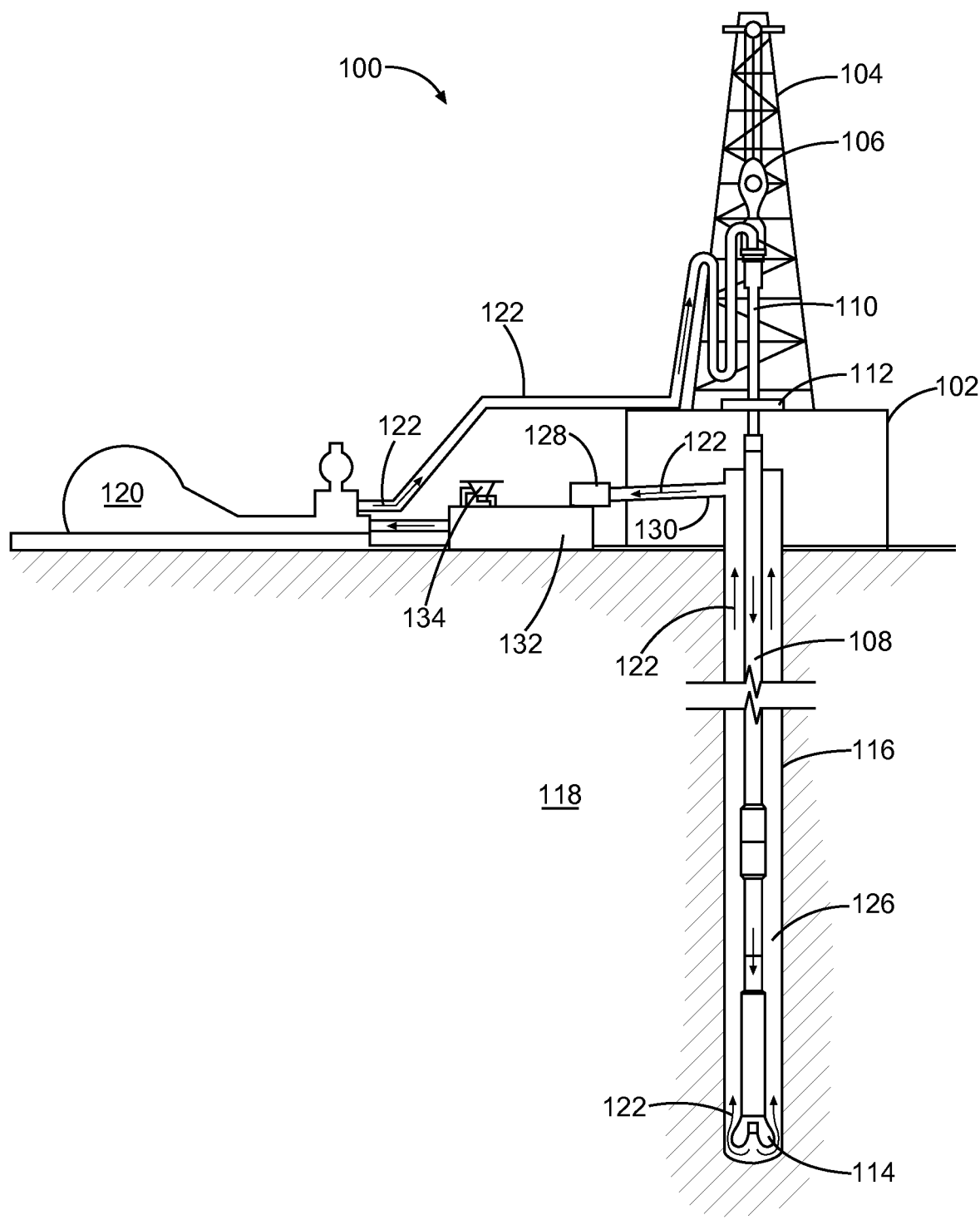
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms.

The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" or "heterocycle" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups. For example, a dioxolanyl ring and a benzdioxolanyl ring system (methylenedioxyphenyl ring system) are both heterocyclyl groups within the meaning herein. The phrase also includes polycyclic ring systems containing a heteroatom such as, but not limited to, quinuclidyl. Heterocyclyl groups can be unsubstituted, or can be substituted as discussed herein. Heterocycle groups include, but are not limited to, pyrrolidine, piperidine, piperazine, morpholine, pyrrole, pyrazole, triazole, tetrazole, oxazole, isoxazole, thiazole, pyridine, thiophene, benzothiophene, benzofurane, dihydrobenzofurane, indole, dihydroindole, azaindole, indazole, benzimidazole, azabenzimidazole, benzoxazole, benzothiazole, benzothiadiazole, imidazopyridine, isoxazolopyridine, thianaphthalene, purine, xanthine, adenine, guanine, quinoline, isoquinoline, tetrahydroquinoline, quinoxaline, and quinazoline groups. Representative substituted heterocyclyl groups can be mono-substituted or substituted more than once, such as, but not limited to, piperidinyl or quinolinyl groups, which are 2-, 3-, 4-, 5-, or 6-substituted, or disubstituted with groups such as those listed herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula $N(group)_3$ wherein each group can independently be H or non-H, such as alkyl, aryl, and the like. Amines include but are not limited to R—$NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —$NH_2$, —NHR, —$NR_2$, —$NR_3^+$, wherein each R is independently selected, and protonated forms of each, except for —$NR_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as ($C_a$-$C_b$)hydrocarbyl, wherein a and b are positive integers and mean having any of a to b number of carbon atoms. For example, ($C_1$-$C_4$)hydrocarbyl means the hydrocarbyl group can be methyl ($C_1$), ethyl ($C_2$), propyl ($C_3$), or butyl ($C_4$), and ($C_0$-$C_b$)hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well, and can also be called a "work-over fluid." Remedial treatments, also called work-over treatments, can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition including the silane-functionalized PAI clay stabilizer, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The polymers described herein can independently terminate in any suitable way. In some embodiments, the polymers can independently terminate with an end group that is independently chosen from a suitable polymerization initiator, —H, —OH, a substituted or unsubstituted ($C_1$-$C_{20}$) hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly (substituted or unsubstituted ($C_1$-$C_{20}$)hydrocarbyloxy), and a poly(substituted or unsubstituted ($C_1$-$C_{20}$)hydrocarbylamino). The polymers can independently have the same or different terminal groups.

As used herein, a "clay stabilizer" is a material that slows or prevents the mechanical or chemical disaggregation of clay, and "clay stabilization" is the slowing or prevention of mechanical or chemical disaggregation of clay. Clay stabilizer can also include the slowing or prevention of generation of fines associated with the clay.

In various embodiments, the present invention provides a method of treating a subterranean formation. The method includes placing in the subterranean formation a silane-functionalized polyalkyleneimine (PAI) clay stabilizer.

In various embodiments, the present invention provides a method of treating a subterranean formation. The method includes placing in the subterranean formation a silane-functionalized polyalkyleneimine (PAI) clay stabilizer. The silane-functionalized PAI clay stabilizer is a polymer including a repeating unit having the following structure:

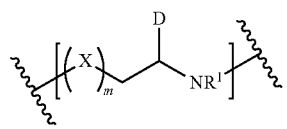

At each occurrence of $R^1$ and D in the same repeating unit, a) $R^1$ is independently selected from the group consisting of —H, -$L^1$-Si—($R^A$)$_3$, and —(X)$_m$—CH$_2$—CHE-N(R$^2$)$_2$, and D is H, or b) $R^1$ and D together in the same repeating unit form a ($C_1$-$C_{10}$)heterocycle with the N to which $R^1$ is bound. At each occurrence, X is independently selected from the group consisting of —(CH$_2$)$_2$—O—, —(CH$_2$)$_3$—O—, —(CH$_2$)$_2$—S—, —(CH$_2$)$_3$—S—, and a —(C$_{1-10}$)alkylene-. At each occurrence, m is about 0 to about 10. At each occurrence, $L^1$ is a substituted or unsubstituted ($C_1$-$C_{20}$) hydrocarbylene interrupted by 0, 1, 2, or 3 groups independently selected from —O—, —S—, and substituted or unsubstituted —NH—. At each occurrence, $R^A$ is independently selected from —O—$R^B$, —H, and —$R^B$, wherein at least one $R^A$ of each —Si—($R^A$)$_3$ is —O—$R^B$. At each occurrence, $R^B$ is independently substituted or unsubstituted ($C_1$-$C_{20}$)hydrocarbyl. At each occurrence of $R^2$ and E in the same R or in the same $R^3$, a) $R^2$ is independently selected from the group consisting of —H, -$L^1$-Si—($R^A$)$_3$, and —(X)$_m$—CH$_2$—CHF—N(R$^3$)$_2$, and E is H, or b) $R^2$ and E together in the same $R^1$ or in the same $R^3$ form a ($C_1$-$C_{10}$) heterocycle with the N to which $R^2$ is bound. At each occurrence of $R^3$ and F in the same $R^2$, a) $R^3$ is independently selected from the group consisting of —H, -$L^1$-Si— ($R^A$)$_3$, and —(X)$_m$—CH$_2$—CHE-N(R$^2$)$_2$, and F is H, or b) $R^3$ and F together in the same $R^2$ form a ($C_1$-$C_{10}$)heterocycle with the N to which $R^3$ is bound. At one or more occurrences, at least one group selected from $R^1$, $R^2$, and $R^3$ in the silane-functionalized PAI clay stabilizer molecule is a silicon-containing group. Each amine group is independently in the form of a neutral amine or a protonated cationic amine.

In various embodiments, the present invention provides a method of treating a subterranean formation. The method includes placing in the subterranean formation a silane-functionalized polyethyleneimine (PEI) clay stabilizer. The silane-functionalized PEI clay stabilizer is a polymer including a repeating unit having the following structure:

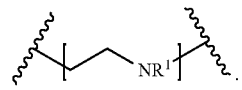

At each occurrence, $R^1$ is independently selected from the group consisting of —H, -$L^1$-Si—($R^A$)$_3$, and —CH$_2$—CH$_2$—N(R$^2$)$_2$. At each occurrence, $L^1$ is a substituted or unsubstituted ($C_1$-$C_{20}$)hydrocarbylene interrupted by 0, 1, 2, or 3 groups independently selected from —O—, —S—, and substituted or unsubstituted —NH—. At each occurrence, $R^A$ is independently selected from —O—$R^B$, —H, and —$R^B$, wherein at least one $R^A$ of each —Si—($R^A$)$_3$ is —O—$R^B$. At each occurrence, $R^B$ is independently substituted or unsubstituted ($C_1$-$C_{20}$)hydrocarbyl. At each occurrence, $R^2$ is independently selected from the group consisting of —H, -$L^1$-Si—($R^A$)$_3$, and —CH$_2$—CH$_2$—N(R$^3$)$_2$. At each occurrence, $R^3$ is independently selected from the group consisting of —H, -$L^1$-Si—($R^A$)$_3$, and —CH$_2$—CH$_2$—N(R$^2$)$_2$. At one or more occurrences, at least one group selected from $R^1$, $R^2$, and $R^3$ in the silane-functionalized PEI clay stabilizer molecule is a silicon-containing group. Each amine group is independently in the form of a neutral amine or a protonated cationic amine.

In various embodiments, the present invention provides a system. The system includes a tubular disposed in a subterranean formation. The system also includes a pump configured to pump a clay stabilizer composition including a silane-functionalized PAI clay stabilizer in the subterranean formation through the tubular.

In various embodiments, the present invention provides a silane-functionalized polyalkyleneimine (PAI) clay stabilizer for treatment of a subterranean formation, wherein the silane-functionalized PAI clay stabilizer is a polymer including a repeating unit having the following structure:

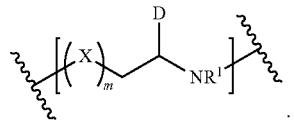

At each occurrence of $R^1$ and D in the same repeating unit, a) $R^1$ is independently selected from the group consisting of —H, -$L^1$-Si—$(R^A)_3$, and —$(X)_m$—$CH_2$—CHE-N$(R^2)_2$, and D is H, or b) $R^1$ and D together in the same repeating unit form a $(C_1$-$C_{10})$heterocycle with the N to which $R^1$ is bound. At each occurrence, X is independently selected from the group consisting of —$(CH_2)_2$—O—, —$(CH_2)_3$—O—, —$(CH_2)_2$—S—, —$(CH_2)_3$—S—, and a —$(C_{1-10})$alkylene-. At each occurrence, m is about 0 to about 10. At each occurrence, $L^1$ is a substituted or unsubstituted $(C_1$-$C_{20})$ hydrocarbylene interrupted by 0, 1, 2, or 3 groups independently selected from —O—, —S—, and substituted or unsubstituted —NH—. At each occurrence, $R^A$ is independently selected from —O—$R^B$, —H, and —$R^B$, wherein at least one $R^A$ of each —Si—$(R^A)_3$ is —O—$R^B$. At each occurrence, $R^B$ is independently substituted or unsubstituted $(C_1$-$C_{20})$hydrocarbyl. At each occurrence of $R^2$ and E in the same $R^1$ or in the same $R^3$, a) $R^2$ is independently selected from the group consisting of —H, -$L^1$-Si—$(R^A)_3$, and —$(X)_m$—$CH_2$—CHF-N$(R^3)_2$, and E is H, or b) $R^2$ and E together in the same $R^1$ or in the same $R^3$ form a $(C_1$-$C_{10})$ heterocycle with the N to which $R^2$ is bound. At each occurrence of $R^3$ and F in the same $R^2$, a) $R^3$ is independently selected from the group consisting of —H, -$L^1$-Si—$(R^A)_3$, and —$(X)_m$—$CH_2$—CHE-N$(R^2)_2$, and F is H, or b) $R^3$ and F together in the same $R^2$ form a $(C_1$-$C_{10})$heterocycle with the N to which $R^3$ is bound. At one or more occurrences, at least one group selected from $R^1$, $R^2$, and $R^3$ in the silane-functionalized PAI clay stabilizer molecule is a silicon-containing group. Each amine group is independently in the form of a neutral amine or a protonated cationic amine.

In various embodiments, the present invention provides a silane-functionalized PEI clay stabilizer for treatment of a subterranean formation. The silane-functionalized PEI clay stabilizer is a polymer including a repeating unit having the following structure:

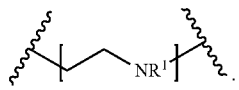

At each occurrence, $R^1$ is independently selected from the group consisting of —H, -$L^1$-Si—$(R^A)_3$, and —$CH_2$—$CH_2$—N$(R^2)_2$. At each occurrence, $L^1$ is a substituted or unsubstituted $(C_1$-$C_{20})$hydrocarbylene interrupted by 0, 1, 2, or 3 groups independently selected from —O—, —S—, and substituted or unsubstituted —NH—. At each occurrence, $R^A$ is independently selected from —O—$R^B$, —H, and —$R^B$, wherein at least one $R^A$ of each —Si—$(R^A)_3$ is —O—$R^B$. At each occurrence, $R^B$ is independently substituted or unsubstituted $(C_1$-$C_{20})$hydrocarbyl. At each occurrence, $R^2$ is independently selected from the group consisting of —H, -$L^1$-Si—$(R^A)_3$, and —$CH_2$—$CH_2$—N$(R^3)_2$. At each occurrence, $R^3$ is independently selected from the group consisting of —H, -$L^1$-Si—$(R^A)_3$, and —$CH_2$—$CH_2$—N$(R^2)_2$. At one or more occurrences, at least one group selected from $R^1$, $R^2$, and $R^3$ in the silane-functionalized clay stabilizer PEI molecule is a silicon-containing group. Each amine group is independently in the form of a neutral amine or a protonated cationic amine.

In various embodiments, the present invention provides a silane-functionalized PEI clay stabilizer for treatment of a subterranean formation, wherein the silane-functionalized PEI clay stabilizer has the structure:

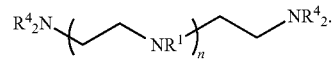

At each occurrence, $R^1$ is independently selected from the group consisting of —H, —$CH_2$—CH(OH)—$(C_1$-$C_8)$alkylene-O—$(C_1$-$C_{10})$alkylene-Si(O—$(C_1$-$C_{10})$alkyl)$_3$, and —$CH_2$—$CH_2$—N$(R^2)_2$, wherein at each occurrence, each $(C_1$-$C_{10})$alkylene, $(C_1$-$C_8)$alkylene, and $(C_1$-$C_{10})$alkyl is independently selected. At each occurrence, $R^2$ is independently selected from the group consisting of —H, -$L^1$-Si—$(R^A)_3$, and —$CH_2$—$CH_2$—N$(R^3)_2$. At each occurrence, $R^3$ is independently selected from the group consisting of —H, -$L^1$-Si—$(R^A)_3$, and —$CH_2$—$CH_2$—N$(R^2)_2$. At each occurrence, $R^4$ is independently selected from the group consisting of —H and -$L^1$-Si—$(R^A)_3$. At one or more occurrences, at least one group selected from $R^1$, $R^2$, $R^3$, and $R^4$ in the silane-functionalized clay stabilizer PEI molecule is a silicon-containing group. The variable n is about 2 to about 1,000,000. Each amine group is independently in the form of a neutral amine or a protonated cationic amine.

In various embodiments, the present invention provides a method of preparing a silane-functionalized PAI clay stabilizer for treatment of a subterranean formation. The method includes forming a mixture including a silane-functionalized epoxide and a PAI. The method also includes allowing the mixture to react to form the silane-functionalized PAI clay stabilizer.

In various embodiments, the present invention provides certain advantages over other clay stabilizers and methods of using the same, at least some of which are unexpected. For example, in some embodiments, the clay stabilizer provides clay and fines control using both electrostatic interaction with the clay and covalent bond formation to the clay (e.g., via formation of silyl bonds to the clay), unlike other clay stabilizers which only provide electrostatic interactions. By providing both electrostatic interactions and covalent bond formations, in various embodiments, the clay stabilizer can provide better control of clay swelling, clay migration, fines generation (e.g., from proppant pack, subterranean formation, or both), or a combination thereof.

In various embodiments, due to silyl bond formation to the clay, the clay stabilizer can provide stronger binding to the clay than provided by other clay stabilizers. In various embodiments, as compared to other clay stabilizers, the clay stabilizer of the present invention can provide a more long-lasting or permanent stabilization against clay swelling, clay migration, fines generation, or a combination thereof, in water-sensitive formations.

In various embodiments, the clay stabilizer can provide fracture face protection, providing a network of clay stabilization at the fracture face, which can prevent formation softening, prevent formation invasion into the proppant pack, prevent proppant embedment into the formation, or a combination thereof. In various embodiments, the clay stabilizer can be more cost effective than other clay stabilizers, and can be formed from readily-available and inexpensive materials. In various embodiments, the clay stabilizer can provide a given amount of stabilization against clay swelling, clay migration, fines generation, or a combination thereof, for a lower cost than other clay stabilizers. In various embodiments, the structure of the clay stabilizer can be easily varied to give customized performance under various conditions, such as variation of the degree of branching of the clay stabilizer, variation of the molecular weight of the clay stabilizer, and the degree of silyl-group functionalization of the clay stabilizer. In various embodiments, the clay stabilizer can be longer lasting than other clay stabilizers, and can be resistant to being washed-off during flow back, production, acid treatments, restimulation of the well, or a combination thereof.

Method of Treating a Subterranean Formation.

In various embodiments, the present invention provides a method of treating a subterranean formation. The method can include placing in the subterranean formation a silane-functionalized PAI clay stabilizer. In some embodiments, the silane-functionalized PAI clay stabilizer is included in a clay stabilizer composition, and the method includes placing the clay stabilizer composition in the subterranean formation. The method can include using the clay stabilizer composition in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof. The method can include performing an operation in the subterranean formation such as drilling, stimulating, fracturing, acidizing, cementing packing, logging; performing a clean-up procedure, a completion procedure, a remedial treatment procedure, an abandonment procedure; applying a pill; using a packer fluid; or a combination thereof.

Clay units typically organize into face-to-face aggregates, but in aqueous conditions, these faces can become negatively charged as water intercalates and exfoliates the clay layers. At the edges, the clay sheets contain an abundance of oxygen atoms and hydroxyl groups that can accept and release protons. Proton release is a dynamic equilibrium and therefore at any given time there is a presence of hydroxyl groups as well as negative charge distribution on the surface of the clay.

The silane-functionalized PAI clay stabilizer can form silyl bonds to clay in the subterranean formation, such as via reaction with —OH groups on the clay surface. For example, an —OH on the clay face can react with Si—O-hydrocarbyl to form an —O—Si bond between the clay stabilizer and the surface of the clay. The formation of silyl bonds between the clay stabilizer and the surface of the clay can provide long-lasting stabilization of the clay. Alternatively, the silyl bonds can be formed between the surface of a proppant and the clay stabilizer. The silane-functionalized PAI clay stabilizer can also interact electrostatically (e.g., electrostatic adsorption) with charges on the surface of the clay. For example, ammonium groups in the clay stabilizer can bind with negative charges on the surface of the clay (e.g., —O— groups, or other negatively charged groups), to bind the clay and the clay stabilizer together. The association between the silane-functionalized PAI clay stabilizer and the clay can hold the clay together, preventing or reducing swelling of the clay, preventing or reducing migration of the clay, preventing or reducing migration of fines associated with the clay (e.g., fines that are in the clay or near the clay), or a combination thereof, such as compared to a corresponding composition free of the silane-functionalized PAI clay stabilizer or having less of the silane-functionalized PAI clay stabilizer therein.

Any suitable type of clay can be stabilized by the clay stabilizer. For example, clays of the montmorillonite (smectite) group such as montmorillonite, saponite, nontronite, hectorite, and sauconite; the kaolin group such as kaolinite, nacrite, dickite, and halloysite; the hydrousmica group such as hydrobiotite, glauconite, illite, and bramallite; the chlorite group such as chlorite and chamosite; clay minerals not belonging to the above groups such as vermiculite, attapulgite, and sepiolite; and mixed-layer varieties of the such minerals and groups. Other mineral components may further be associated with the clay. The clay stabilizer can be a shale stabilizer.

The placing of the silane-functionalized PAI clay stabilizer or a clay stabilizer composition including the same in the subterranean formation can include contacting the clay stabilizer or the clay stabilizer composition and any suitable part of the subterranean formation, or contacting the clay stabilizer or the clay stabilizer composition and a subterranean material, such as any suitable subterranean material. The subterranean formation can be any suitable subterranean formation. In some examples, the placing of the clay stabilizer or the clay stabilizer composition in the subterranean formation includes contacting the clay stabilizer or the clay stabilizer composition with or placing the clay stabilizer or the clay stabilizer composition in at least one of a fracture, a part of an area surrounding a fracture, a flow pathway, an area surrounding a flow pathway, and an area desired to be fractured. The placing of the clay stabilizer or the clay stabilizer composition in the subterranean formation can be any suitable placing and can include any suitable contacting between the subterranean formation and the clay stabilizer or the clay stabilizer composition. The placing of the clay stabilizer or the clay stabilizer composition in the subterranean formation can include at least partially depositing the clay stabilizer or the clay stabilizer composition in a fracture, flow pathway, or area surrounding the same.

In some embodiments, the method includes obtaining or providing the clay stabilizer composition including the silane-functionalized PAI clay stabilizer. The obtaining or providing of the clay stabilizer composition can occur at any suitable time and at any suitable location. The obtaining or providing of the clay stabilizer composition can occur above the surface (e.g., one or more components of the clay stabilizer composition can be combined above the surface). The obtaining or providing of the composition can occur in the subterranean formation (e.g., one or more components of the clay stabilizer composition can be combined downhole). The method can include combining the silane-functionalized PAI clay stabilizer with an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form the clay stabilizer composition.

The method can include hydraulic fracturing, such as a method of hydraulic fracturing to generate a fracture or flow pathway. The placing of the clay stabilizer or the clay stabilizer composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the clay stabilizer or the clay stabilizer composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the clay stabilizer or the clay stabilizer composition is placed in or contacted to, or the clay stabilizer or the clay stabilizer composition is placed in or contacted to an area surrounding the generated fracture or flow pathway.

The clay stabilizer composition including the silane-functionalizd PAI clay stabilizer can be an oil-based composition (e.g., 50 wt % or more oil-based liquids) or a water-based composition (e.g., 50 wt % or more water). The clay stabilizer composition can be a water- or oil-based emulsion, wherein the silane-functionalized PAI can be at least partially dissolved in the water-phase of the emulsion.

The clay stabilizer composition can include a carrier fluid. The PAI clay stabilizer can be dispersed, dissolved, or a combination thereof, in the carrier fluid. The carrier fluid can include any one or more suitable fluids. The carrier fluid (e.g., the one or more fluids) can form any suitable proportion of the clay stabilizer composition, such as about 0.001 wt % to about 99.999 wt % of the clay stabilizer composition, about 50 wt % to about 99.999 wt %, about 80 wt % to about 99.999 wt %, or about 0.001 wt % or less, or about less than, equal to, or more than about 0.01 wt %, 0.1, 1, 2, 3, 4, 5, 6, 8, 10, 12, 14, 16, 18, 20, 25, 30, 35, 40, 45, 50, 55, 60, 65, 70, 72, 74, 76, 78, 80, 82, 84, 86, 88, 90, 91, 92, 93, 94, 95, 96, 97, 98, 99, 99.9, 99.99 wt %, or about 99.999 wt % or more.

The clay stabilizer composition can include one silane-functionalized PAI clay stabilizer, or more than one silane-functionalized PAI clay stabilizer. The one or more silane-functionalized PAI clay stabilizers can form any suitable proportion of the clay stabilizer composition, such as about 0.0001 wt % to about 99.999 wt % of the clay stabilizer composition, or about 0.001 wt % to about 10 wt %, about 0.0001 wt % or less, or less than, equal to, or more than about 0.001 wt %, 0.01, 0.1, 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99 wt %, or about 99.999 wt % or more.

Silane-Functionalized Polyalkyleneimine (PAI) Clay Stabilizer.

In some embodiments, the silane-functionalized PAI clay stabilizer can be a polymer (e.g., a homopolymer or a copolymer) including a repeating unit having the following structure:

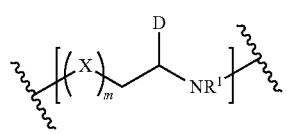

At each occurrence of $R^1$ and D in the same repeating unit, a) $R^1$ can be independently selected from the group consisting of —H, -$L^1$-Si—$(R^A)_3$, and —$(X)_m$—$CH_2$—CHE-$N(R^2)_2$, and D is H, or b) $R^1$ and D together in the same repeating unit can form a ($C_1$-$C_{10}$)heterocycle with the N to which $R^1$ is bound. At each occurrence, X can be independently selected from the group consisting of —$(CH_2)_2$—O—, —$(CH_2)_3$—O—, —$(CH_2)_2$—S—, —$(CH_2)_3$—S—, and a —$(C_{1-10})$alkylene-. At each occurrence, m can be about 0 to about 10 (e.g., 0, 1, 2, 3, 4, 5, 6, 7, 8, 9, or 10). At each occurrence, $L^1$ can be a substituted or unsubstituted ($C_1$-$C_{20}$)hydrocarbylene interrupted by 0, 1, 2, or 3 groups independently selected from —O—, —S—, and substituted or unsubstituted —NH—. At each occurrence, $R^A$ can be independently selected from —O—$R^B$, —H, and —$R^B$, wherein at least one $R^A$ of each —Si—$(R^A)_3$ is —O—$R^B$. At each occurrence, $R^B$ can be independently substituted or unsubstituted ($C_1$-$C_{20}$)hydrocarbyl. At each occurrence of $R^2$ and E in the same $R^1$ or in the same $R^3$, a) $R^2$ can be independently selected from the group consisting of —H, -$L^1$-Si—$(R^A)_3$, and —$(X)_m$—$CH_2$—CHF—$N(R^3)_2$, and E is H, or b) $R^2$ and E together in the same $R^1$ or in the same $R^3$ can form a ($C_1$-$C_{10}$)heterocycle with the N to which $R^2$ is bound. At each occurrence of $R^3$ and F in the same $R^2$, a) $R^3$ is independently selected from the group consisting of —H, -$L^1$-Si—$(R^A)_3$, and —$(X)_m$—$CH_2$—CHE-$N(R^2)_2$, and F is H, or b) $R^3$ and F together in the same $R^2$ form a ($C_1$-$C_{10}$)heterocycle with the N to which $R^3$ is bound. At one or more occurrences, at least one group selected from $R^1$, $R^2$, and $R^3$ in the silane-functionalized PAI clay stabilizer molecule is a silicon-containing group. Each amine group can be independently in the form of a neutral amine or a protonated cationic amine.

The silane-functionalized PAI clay stabilizer can have the structure:

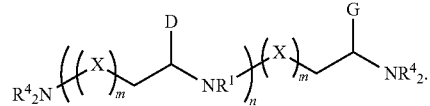

At each occurrence of $R^4$ in an end group not including G, $R^4$ can be independently selected from the group consisting of —H and -$L^1$-Si—$(R^A)_3$. At each occurrence of $R^4$ and G in the same end group, a) $R^4$ can be independently selected from the group consisting of —H and -$L^1$-Si—$(R^A)_3$ and G is H, or b) $R^4$ and G together in the same end group can form a ($C_1$-$C_{10}$)heterocycle with the N to which $R^4$ is bound. The variable n can be about 2 to about 1,000,000. Each amine group can be independently in the form of a neutral amine or a protonated cationic amine.

In some embodiments, the silane-functionalized PAI clay stabilizer can be a polyethyleneimine (PEI) clay stabilizer. At each occurrence m can be 0. At each occurrence D, E, F, and G can be H. The silane-functionalized PEI clay stabilizer can be a polymer (e.g., a homopolymer or a copolymer) including a repeating unit having the following structure:

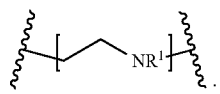

Each amine group can be independently in the form of a neutral amine or a protonated cationic amine. At each occurrence, $R^2$ can be independently selected from the group consisting of —H, -$L^1$-Si—$(R^4)_3$, and —$CH_2$—$CH_2$—N $(R^3)_2$. At each occurrence, $R^3$ can be independently selected from the group consisting of —H, -$L^1$-Si—$(R^4)_3$, and —$CH_2$—$CH_2$—N($R^2)_2$. At one or more occurrences, at least one group selected from $R^1$, $R^2$, and $R^3$ in the silane-functionalized PEI clay stabilizer molecule can be a silicon-containing group At each occurrence, $R^1$ can be independently selected from the group consisting of —H, -$L^1$-Si—$(R^4)_3$, and —$CH_2$—$CH_2$—N($R^2)_2$. At each occurrence, $L^1$ can be a substituted or unsubstituted ($C_1$-$C_{20}$)hydrocarbylene interrupted by 0, 1, 2, or 3 groups independently selected from —O—, —S—, and substituted or unsubstituted —NH—. At each occurrence, $L^1$ can be a substituted or unsubstituted ($C_1$-$C_{20}$)alkylene interrupted by —O—. At each occurrence, $L^1$ independently can have the structure -$L^2$-O-$L^3$-. At each occurrence, $L^2$ can be independently substituted or unsubstituted ($C_1$-$C_{10}$)alkylene. At each occurrence, $L^2$ can be independently unsubstituted ($C_1$-$C_5$)alkylene. At each occurrence, $L^3$ can be independently substituted or unsubstituted ($C_1$-$C_{10}$)alkylene. At each occurrence, $L^3$ can be independently a hydroxy-substituted ($C_1$-$C_{10}$)alkylene. At each occurrence, $L^3$ can be independently —($C_1$-$C_8$)alkylene-CH(OH)—$CH_2$—, wherein the hydroxy group is on the carbon beta to the amine. The variable $L^3$ can be —$CH_2$—CH(OH)—$CH_2$—. The variable $L^1$ can be —$(CH_2)_3$—O—$CH_2$—CH(OH)—$CH_2$—, wherein the hydroxy group is on the carbon beta to the amine. At each occurrence, $R^A$ can be independently selected from —O—$R^B$, —H, and —$R^B$, wherein at least one $R^A$ of each —Si—$(R^A)_3$ is —O—$R^B$. At each occurrence, $R^B$ can be independently substituted or unsubstituted ($C_1$-$C_{20}$)hydrocarbyl. The variable $R^A$ can be —O—$R^B$. At each occurrence, $R^B$ can be independently ($C_1$-$C_{20}$)alkyl. At each occurrence, $R^B$ can be independently ($C_1$-$C_8$)alkyl. The variable $R^B$ can be methyl. The group -$L^1$-Si—$(R^A)_3$ can be —$CH_2$—CH(OH)—$CH_2$—O—$(CH_2)_3$—Si($OCH_3)_3$.

The silane-functionalized PAI clay stabilizer can be a homopolymer. The silane-functionalized PAI clay stabilizer can have the structure:

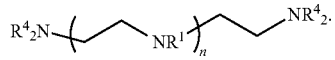

Each amine group is independently in the form of a neutral amine or a protonated cationic amine. At each occurrence, $R^4$ can be independently selected from the group consisting of —H and -L-Si—$(R^A)_3$. The variable n is about 2 to about 1,000,000, about 2 to about 1,000, about 2 to about 100, or about 2, or less than, equal to, or greater than 3, 4, 5, 6, 7, 8, 9, 10, 12, 14, 16, 18, 20, 22, 24, 26, 28, 30, 35, 40, 45, 50, 55, 60, 65, 70, 75, 80, 90, 100, 125, 150, 175, 200, 250, 300, 350, 400, 450, 500, 600, 700, 800, 900, 1,000, 1,500, 2,000, 2,500, 5,000, 10,000, 20,000, 50,000, 100,000, 500,000, or about 1,000,000 or more. At one or more occurrences, at least one group selected from $R^1$, $R^2$, $R^3$, and $R^4$ in the silane-functionalized PEI clay stabilizer molecule is a silicon-containing group.

The ratio of the number of -$L^1$-Si—$(R^A)_3$ groups in the silane-functionalized PAI to the number of times the repeating group repeats can be any suitable ratio, such as about 1:100,000 to about 100:1, about 2:1 to about 6:1, about 1:100,000 or less, or less than, equal to, or more about 1:50,000, 1:10,000, 1:5,000, 1:2,500, 1:1,000, 1:500, 1:250, 1:100, 1:50, 1:25, 1:10, 1:8, 1:6, 1:4, 1:2, 1:1, 1.5:1, 2:1, 2.5:1, 3:1, 3.5:1, 4:1, 4.5:1, 5:1, 5.5:1, 6:1, 7:1, 8:1, 9:1, 10:1, 12:1, 14:1, 16:1, 20:1, 25:1, 50:1, 75:1, or about 100:1 or more. In various embodiments, each PAI repeating unit includes at least 2 silane groups, or 3, 4, 5, or at least 6 or more silane groups. The ratio of the number of quaternary ammonium groups (e.g., —$NH_3^+$, —$NRH_2^+$, —$NR_2H^+$, or a combination thereof), or of the number of primary and secondary amine groups (e.g., protonated or not protonated), to the number of times the repeating group repeats can be any suitable ratio, such as about 1:100,000 to about 100:1, about 2:1 to about 6:1, about 1:100,000 or less, or less than, equal to, or more than about 1:50,000, 1:10,000, 1:5,000, 1:2,500, 1:1,000, 1:500, 1:250, 1:100, 1:50, 1:25, 1:10, 1:8, 1:6, 1:4, 1:2, 1:1, 1.5:1, 2:1, 2.5:1, 3:1, 3.5:1, 4:1, 4.5:1, 5:1, 5.5:1, 6:1, 7:1, 8:1, 9:1, 10:1, 12:1, 14:1, 16:1, 20:1, 25:1, 50:1, 75:1, or about 100:1 or more. Per molecule, the clay stabilizer can include any suitable number of primary and secondary amine groups, e.g., —$NH_2$, —$NH_3$, —$NRH_2$, —$NR_2H+$, or a combination thereof, such as greater than, equal to, or less than, about 1,000,000, 500,000, 100,000, 50,000, 20,000, 10,000, 5,000, 2,000, 1,000, 500, 250, 100, 50, 25, 10, 8, 6, 4, 2, or 1.

The silane-functionalized PEI clay stabilizer can have the structure:

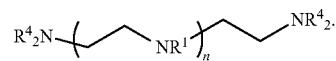

Each amine group is independently in the form of a neutral amine or a protonated cationic amine. At each occurrence, $R^1$ can be independently selected from the group consisting of —H, —$CH_2$—CH(OH)—($C_1$-$C_8$)alkylene-O—($C_1$-$C_{10}$)alkylene-Si(O—($C_1$-$C_{10}$)alkyl)$_3$, and —$CH_2$—$CH_2$—N($R^2)_2$, wherein at each occurrence, each ($C_1$-$C_{10}$)alkylene, ($C_1$-$C_8$)alkylene, and ($C_1$-$C_{10}$)alkyl is independently selected. At each occurrence, $R^2$ can be independently selected from the group consisting of —H, —$CH_2$—CH(OH)—($C_1$-$C_8$)alkylene-O—($C_1$-$C_{10}$)alkylene-Si(O—($C_1$-$C_{10}$)alkyl)$_3$, and —$CH_2$—$CH_2$—N($R^3)_2$. At each occurrence, $R^3$ can be independently selected from the group consisting of —H, —$CH_2$—CH(OH)—($C_1$-$C_8$)alkylene-O—($C_1$-$C_{10}$)alkylene-Si(O—($C_1$-$C_{10}$)alkyl)$_3$, and —$CH_2$—$CH_2$—N($R^2)_2$. At each occurrence, $R^4$ can be independently selected from the group consisting of —H and —$CH_2$—CH(OH)—($C_1$-$C_8$)alkylene-O—($C_1$-$C_{10}$)alkylene-Si(O—($C_1$-$C_{10}$)alkyl)$_3$. The variable n is about 2 to about 1,000,000, about 2 to about 1,000, about 2 to about 100, or about 2, or less than, equal to, or greater than 3, 4, 5, 6, 7, 8, 9, 10, 12, 14, 16, 18, 20, 22, 24, 26, 28, 30, 35, 40, 45, 50, 55, 60, 65, 70, 75, 80, 90, 100, 125, 150, 175, 200, 250, 300, 350, 400, 450, 500, 600, 700, 800, 900, 1,000, 1,500, 2,000, 2,500, 5,000, 10,000, 20,000, 50,000, 100,000, 500,000, or about 1,000,000 or more.

The silane-functionalized PEI clay stabilizer can have the structure:

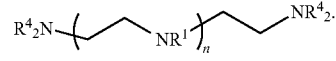

Each amine group is independently in the form of a neutral amine or a protonated cationic amine. At each occurrence, $R^1$ can be independently selected from the group consisting of —H, —CH$_2$—CH(OH)—CH$_2$—O—(CH$_2$)$_3$—Si(OCH$_3$)$_3$, and —CH$_2$—CH$_2$—N(R$^2$)$_2$. At each occurrence, $R^2$ can be independently selected from the group consisting of —H, —CH$_2$—CH(OH)—CH$_2$—O—(CH$_2$)$_3$—Si(OCH$_3$)$_3$, and —CH$_2$—CH$_2$—N(R$^3$)$_2$. At each occurrence, $R^3$ can be independently selected from the group consisting of —H, —CH$_2$—CH(OH)—CH$_2$—O—(CH$_2$)$_3$—Si(OCH$_3$)$_3$, and —CH$_2$—CH$_2$—N(R$^2$)$_2$. At each occurrence, $R^4$ can be independently selected from the group consisting of —H and —CH$_2$—CH(OH)—CH$_2$—O—(CH$_2$)$_3$—Si(OCH$_3$)$_3$. At one or more occurrences, at least one group selected from $R^1$, $R^2$, $R^3$, and $R^4$ in the silane-functionalized PEI clay stabilizer molecule is a silicon-containing group. The variable n is about 2 to about 1,000,000, about 2 to about 1,000, about 2 to about 100, or about 2, or less than, equal to, or greater than 3, 4, 5, 6, 7, 8, 9, 10, 12, 14, 16, 18, 20, 22, 24, 26, 28, 30, 35, 40, 45, 50, 55, 60, 65, 70, 75, 80, 90, 100, 125, 150, 175, 200, 250, 300, 350, 400, 450, 500, 600, 700, 800, 900, 1,000, 1,500, 2,000, 2,500, 5,000, 10,000, 20,000, 50,000, 100,000, 500,000, or about 1,000,000 or more.

Other Components.

The clay stabilizer composition including the silane-functionalized PAI clay stabilizer, or a mixture including the composition, can include any suitable additional component in any suitable proportion, such that the silane-functionalized PAI clay stabilizer, clay stabilizer composition, or mixture including the same, can be used as described herein. Any component listed in this section can be present or not present in the composition or a mixture including the same.

In various embodiments, the clay stabilizer composition can further include a secondary clay stabilizer (e.g., a clay stabilizer in addition to the silane-functionalized PAI clay stabilizer). The secondary clay stabilizer can be potassium chloride, a non-polymeric ionic liquid (e.g., including a substituted imidazolium ion or a substituted quaternary ammonium ion, such as 1-ethyl-3-methylimidazolium chloride, tris-(2-hydroxyethyl)-methylammonium methylsulfate, methyl tri-n-butyl ammonium methylsulfate, 1-ethyl-3-methylimidazolium methanesulfonate, 1-butyl-3-methyl-imidazolium chloride, 1-butyl-3-methylimidazolium methanesulfonate, 1-ethyl-2,3-di-methylimidazolium ethylsulfate, or 1,2,3-trimethyl-imidazolium methylsulfate), an inorganic phosphate, a polyalkoxy diamine or a salt thereof, choline or a choline derivative, an oligomethylene diamine or a salt thereof, an addition product of carboxymethyl cellulose and an organic amine, 1,2-cyclohexanediamine or a salt thereof, a salt of a phosphoric acid ester of an oxyalkylated polyol, a combination of a partially hydrolyzed acrylic copolymer potassium chloride and polyanionic cellulose, a quaternary ammonium compound, a polymer based on dialkyl aminoalkyl methacrylate, an aqueous solution containing a polymer with hydrophilic and hydrophobic groups, a reaction product of a polyhydroxyalkane and an alkylene oxide, or a combination thereof. The secondary clay stabilizer can be CLAY GRABBER®, CLAYSEAL®, CRYSTAL-DRIL®, CLAY SYNC™ II, Sandwedge®, H2Zero™, Clayfix™ 3, Cla-Sta® XP, Cla-Sta® FS, Cla-Web™, or a combination thereof. In some embodiments, the secondary clay stabilizer can be about 0.000.1 wt % to about 50 wt % of the clay stabilizer composition or a mixture including the same, about 0.000.1 wt % to about 10 wt %, about 0.004 wt % to about 0.01 wt % of the composition, or about 0.000.1 wt % or less, or less than, equal to, or more than about 0.000.5 wt %, 0.001, 0.005, 0.01, 0.05, 0.1, 0.5, 1, 2, 3, 4, 5, 6, 7, 8, 9, or about 10 wt % or more.

In some embodiments, the clay stabilizer composition or a mixture including the same includes one or more viscosifiers. The viscosifier can be any suitable viscosifier. The viscosifier can affect the viscosity of the clay stabilizer composition or a solvent that contacts the clay stabilizer composition at any suitable time and location. In some embodiments, the viscosifier provides an increased viscosity at least one of before injection into the subterranean formation, at the time of injection into the subterranean formation, during travel through a tubular disposed in a borehole, once the clay stabilizer composition reaches a particular subterranean location, or some period of time after the clay stabilizer composition reaches a particular subterranean location. In some embodiments, the viscosifier can be about 0.000.1 wt % to about 10 wt % of the clay stabilizer composition or a mixture including the same, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the clay stabilizer composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide and a poly(($C_2$-$C_{10}$)alkene), wherein the ($C_2$-$C_{10}$)alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly (vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C=C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethyl-pentanoate, vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen-containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the clay stabilizer composition or a mixture including the same can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$) hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$) alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the clay stabilizer composition or a mixture including the same, about 0.001 wt % to about 0.01 wt %, or about 0.000.01 wt % or less, or about 0.000.05 wt %, 0.000,1, 0.000,5, 0.001, 0.005, 0.01, 0.05, 0.1, 0.5, 1, 2, 3, 4, or about 5 wt % or more.

In some embodiments, the clay stabilizer composition or a mixture including the same can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $N^{a+}$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hypochlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the clay stabilizer composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The clay stabilizer composition, or a mixture including the clay stabilizer composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the clay stabilizer composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The clay stabilizer composition including the silane-functionalized PAI clay stabilizer or a mixture including the same can include any suitable downhole fluid. The clay stabilizer composition can be combined with any suitable downhole fluid before, during, or after the placement of the composition in the subterranean formation or the contacting of the composition and the subterranean material. In some examples, the clay stabilizer composition is combined with a downhole fluid above the surface, and then the combined composition is placed in a subterranean formation or contacted with a subterranean material. In another example, the clay stabilizer composition is injected into a subterranean formation to combine with a downhole fluid, and the combined composition is contacted with a subterranean material or is considered to be placed in the subterranean formation. The placement of the clay stabilizer composition in the subterranean formation can include contacting the subterranean material and the mixture. Any suitable weight percent of the clay stabilizer composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the clay stabilizer composition or mixture including the same.

In some embodiments, the clay stabilizer composition, or a mixture including the same, can include any suitable amount of any suitable material used in a downhole fluid. For example, the clay stabilizer composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the clay stabilizer composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the clay stabilizer composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™ DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUD-LUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BAROFIBRE™, STEELSEAL®, and HYDRO-PLUG® lost circulation management materials. Any suitable proportion of the clay stabilizer composition or mixture including the clay stabilizer composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the clay stabilizer composition or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the clay stabilizer composition or a mixture including the same in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments, the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The clay stabilizer composition can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the clay stabilizer composition or a mixture including the same. For example, the clay stabilizer composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the clay stabilizer composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.0001 mm to about 3 mm, about 0.015 mm to about 2.5 mm, about 0.025 mm to about 0.43 mm, about 0.043 mm to about 0.85 mm, about 0.085 mm to about 1.18 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The clay stabilizer composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

In various embodiments, the silane-functionalized PAI clay stabilizer or clay stabilizer composition including the same can directly or indirectly affect one or more components or pieces of equipment associated with the preparation, delivery, recapture, recycling, reuse, and/or disposal of the disclosed silane-functionalized PAI clay stabilizer or clay stabilizer composition including the same. For example, and with reference to FIG. 1, the silane-functionalized PAI clay stabilizer or clay stabilizer composition including the same can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While the fluid processing unit(s) 128 is illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The silane-functionalized PAI clay stabilizer or clay stabilizer composition including the same can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the silane-functionalized PAI clay stabilizer or clay stabilizer composition including the same can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the silane-functionalized PAI clay stabilizer or clay stabilizer composition including the same can be stored, reconditioned, and/or regulated until added to the drilling fluid 122.

As mentioned above, the silane-functionalized PAI clay stabilizer or clay stabilizer composition including the same can directly or indirectly affect the components and equipment of the drilling assembly 100. For example, the silane-functionalized PAI clay stabilizer or clay stabilizer composition including the same can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the silane-functionalized PAI clay stabilizer or clay stabilizer composition including the same.

The silane-functionalized PAI clay stabilizer or clay stabilizer composition including the same can directly or indirectly affect the pump 120, which representatively includes any conduits, pipelines, trucks, tubulars, and/or pipes used to fluidically convey the silane-functionalized PAI clay stabilizer or clay stabilizer composition including the same to the subterranean formation; any pumps, compressors, or motors (e.g., topside or downhole) used to drive the composition into motion; any valves or related joints used to regulate the pressure or flow rate of the composition; and any sensors (e.g., pressure, temperature, flow rate, and the like), gauges, and/or combinations thereof, and the like. The silane-functionalized PAI clay stabilizer or clay stabilizer composition including the same can also directly or indirectly affect the mixing hopper 134 and the retention pit 132 and their assorted variations.

The silane-functionalized PAI clay stabilizer or clay stabilizer composition including the same can also directly or indirectly affect the various downhole or subterranean equipment and tools that can come into contact with the silane-functionalized PAI clay stabilizer or clay stabilizer composition including the same such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The silane-functionalized PAI clay stabilizer or clay stabilizer composition including the same can also directly or indirectly affect any downhole heat exchangers, valves, and corresponding actuation devices, tool seals, packers, and other wellbore isolation devices or components, and the like associated with the wellbore 116. The silane-functionalized PAI clay stabilizer or clay stabilizer composition including the same can also directly or indirectly affect the drill bit 114, which can include roller cone bits, polycrystalline diamond compact (PDC) bits, natural diamond bits, hole openers, reamers, coring bits, and the like.

While not specifically illustrated herein, the silane-functionalized PAI clay stabilizer or clay stabilizer composition including the same can also directly or indirectly affect any transport or delivery equipment used to convey the clay stabilizer or the composition including the same to the drilling assembly 100 such as, for example, any transport vessels, conduits, pipelines, trucks, tubulars, and/or pipes used to fluidically move the clay stabilizer or composition from one location to another; any pumps, compressors, or motors used to drive the clay stabilizer composition into motion; any valves or related joints used to regulate the pressure or flow rate of the clay stabilizer composition; and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the clay stabilizer composition described herein in a subterranean formation, or that can perform or be generated by performance of a method for using the clay stabilizer composition described herein.

The system can include a tubular disposed in a subterranean formation. The system can include a pump configured to pump a clay stabilizer composition including a silane-functionalized PAI clay stabilizer in the subterranean formation through the tubular.

The system can include a clay stabilizer composition including a silane-functionalized PAI clay stabilizer. The system can also include a subterranean formation including the clay stabilizer composition therein. In some embodiments, the clay stabilizer composition in the system can also include a downhole fluid, or the system can include a mixture of the clay stabilizer composition and downhole fluid. In some embodiments, the system can include a tubular, and a pump configured to pump the clay stabilizer composition into the subterranean formation through the tubular.

Various embodiments provide systems and apparatus configured for delivering the clay stabilizer composition described herein to a subterranean location and for using the clay stabilizer composition therein, such as for a drilling operation, or a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a clay stabilizer composition including the silane-functionalized PAI clay stabilizer described herein.

In some embodiments, the system can include a drill string disposed in a wellbore, with the drill string including a drill bit at a downhole end of the drill string. The system can also include an annulus between the drill string and the wellbore. The system can also include a pump configured to circulate the clay stabilizer composition through the drill string, through the drill bit, and back above-surface through the annulus. In some embodiments, the system can include a fluid processing unit configured to process the clay stabilizer composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the clay stabilizer composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the clay stabilizer composition to the high pressure pump. In such embodiments, the low pressure pump can "step up" the pressure of the clay stabilizer composition before it reaches the high pressure pump.

In some embodiments, the systems or apparatuses described herein can further include a mixing tank that is upstream of the pump and in which the clay stabilizer composition is formulated. In various embodiments, the pump (e.g., a low pressure pump, a high pressure pump, or a combination thereof) can convey the clay stabilizer composition from the mixing tank or other source of the clay stabilizer composition to the tubular. In other embodiments, however, the clay stabilizer composition can be formulated offsite and transported to a worksite, in which case the clay stabilizer composition can be introduced to the tubular via the pump directly from its shipping container (e.g., a truck, a railcar, a barge, or the like) or from a transport pipeline. In either case, the clay stabilizer composition can be drawn into the pump, elevated to an appropriate pressure, and then introduced into the tubular for delivery to the subterranean formation.

Figure 2:
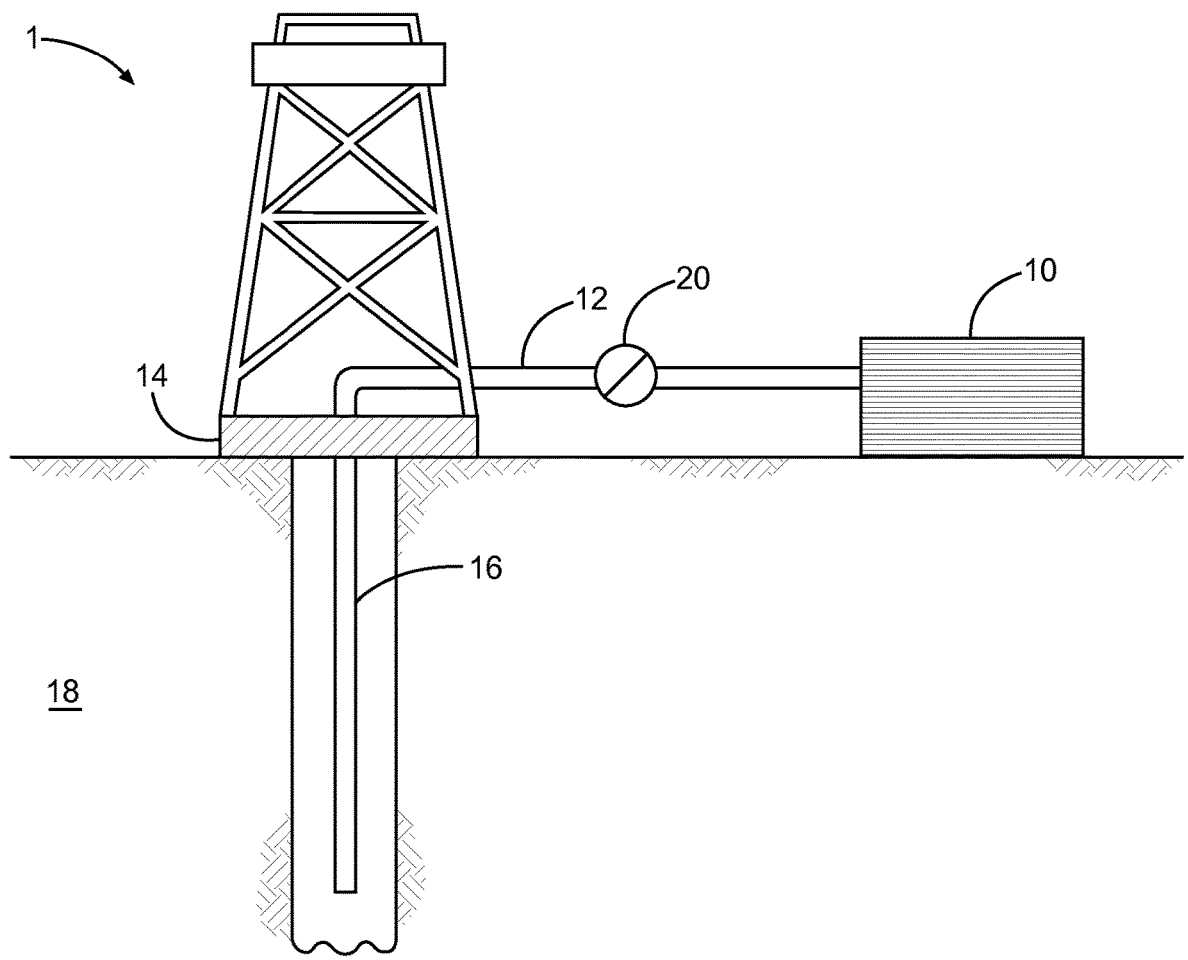
FIG. 2 illustrates a system or apparatus for delivering a composition to a subterranean formation, in accordance with various embodiments.

FIG. 2 shows an illustrative schematic of systems and apparatuses that can deliver embodiments of the clay stabilizer compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the clay stabilizer composition can be formulated. The clay stabilizer composition can be conveyed via line 12 to wellhead 14, where the clay stabilizer composition enters tubular 16, with tubular 16 extending from wellhead 14 into subterranean formation 18. Upon being ejected from tubular 16, the clay stabilizer composition can subsequently penetrate into subterranean formation 18. Pump 20 can be configured to raise the pressure of the clay stabilizer composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the clay stabilizer composition can, in some embodiments, flow back to wellhead 14 and exit subterranean formation 18. The clay stabilizer composition that flows back can be substantially diminished in the concentration of the silane-functionalized PAI clay stabilizer therein. In some embodiments, the clay stabilizer composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the clay stabilizer composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Clay Stabilizer and Composition Including the Same.

Various embodiments provide a silane-functionalized clay stabilizer or a clay stabilizer composition including the same for treatment of a subterranean formation. The clay stabilizer or clay stabilizer composition can be any suitable clay stabilizer or clay stabilizer composition that can be used to perform an embodiment of the method for treatment of a subterranean formation described herein. For example, the clay stabilizer can be a silane-functionalized PAI clay stabilizer for treatment of a subterranean formation.

In some embodiments, the clay stabilizer composition further include, or can be, a downhole fluid. The downhole fluid can be any suitable downhole fluid. In some embodiments, the downhole fluid can be a drilling fluid or a fracturing fluid.

In various embodiments, the present invention provides a silane-functionalized polyalkyleneimine (PAI) clay stabilizer for treatment of a subterranean formation, wherein the silane-functionalized PAI clay stabilizer is a polymer including a repeating unit having the following structure:

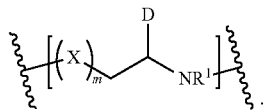

At each occurrence of $R^1$ and D in the same repeating unit, a) $R^1$ can be independently selected from the group consisting of —H, -$L^1$-Si—$(R^4)_3$, and —$(X)_m$—$CH_2$—CHE-N$(R^2)_2$, and D is H, or b) $R^1$ and D together in the same repeating unit can form a $(C_1$-$C_{10})$heterocycle with the N to which $R^1$ is bound. At each occurrence, X can be independently selected from the group consisting of —$(CH_2)_2$—O—, —$(CH_2)_3$—O—, —$(CH_2)_2$—S—, —$(CH_2)_3$—S—, and a —$(C_{1-10})$alkylene-. At each occurrence, m can be about 0 to about 10. At each occurrence, $L^1$ can be a substituted or unsubstituted $(C_1$-$C_{20})$hydrocarbylene interrupted by 0, 1, 2, or 3 groups independently selected from —O—, —S—, and substituted or unsubstituted —NH—. At each occurrence, $R^A$ can be independently selected from —O—$R^B$, —H, and —$R^B$, wherein at least one $R^A$ of each —Si—$(R^A)_3$ is —O—$R^B$. At each occurrence, $R^B$ can be independently substituted or unsubstituted $(C_1$-$C_{20})$hydrocarbyl. At each occurrence of $R^2$ and E in the same $R^1$ or in the same $R^3$, a) $R^2$ can be independently selected from the group consisting of —H, -$L^1$-Si—$(R^4)_3$, and —$(X)_m$—$CH_2$—CHF—N$(R^3)_2$, and E is H, or b) $R^2$ and E together in the same $R^1$ or in the same $R^3$ can form a $(C_1$-$C_{10})$heterocycle with the N to which $R^2$ is bound. At each occurrence of $R^3$ and F in the same $R^2$, a) $R^3$ is independently selected from the group consisting of —H, -$L^1$-Si—$(R^4)_3$, and —$(X)_m$—$CH_2$—CHE-N$(R^2)_2$, and F is H, or b) $R^3$ and F together in the same $R^2$ form a $(C_1$-$C_{10})$heterocycle with the N to which $R^3$ is bound. At one or more occurrences, at least one group selected from $R^1$, $R^2$, and $R^3$ in the silane-functionalized PAI clay stabilizer molecule is a silicon-containing group. Each amine group can be independently in the form of a neutral amine or a protonated cationic amine. Various embodiments provide a clay stabilizer composition including the silane-functionalized PAI clay stabilizer.

In some embodiments, the present invention provides a silane-functionalized PEI clay stabilizer for treatment of a subterranean formation, wherein the silane-functionalized PEI clay stabilizer is a polymer including a repeating unit having the following structure:

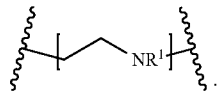

At each occurrence, $R^1$ can be independently selected from the group consisting of —H, -$L^1$-Si—$(R^4)_3$, and —$CH_2$—$CH_2$—N$(R^2)_2$. At each occurrence, $L^1$ can be a substituted or unsubstituted $(C_1$-$C_{20})$hydrocarbylene interrupted by 0, 1, 2, or 3 groups independently selected from —O—, —S—, and substituted or unsubstituted —NH—. At each occurrence, $R^A$ can be independently selected from —O—$R^B$, —H, and —$R^B$, wherein at least one $R^A$ of each —Si—$(R^A)_3$ is —O—$R^B$. At each occurrence, $R^B$ can be independently substituted or unsubstituted $(C_1$-$C_{20})$hydrocarbyl. At each occurrence, $R^2$ can be independently selected from the group consisting of —H, -L$^1$-Si—(R$^4$)$_3$, and —CH$_2$—CH$_2$—N(R$^3$)$_2$. At each occurrence, R$^3$ can be independently selected from the group consisting of —H, -L$^1$-Si—(R$^4$)$_3$, and —CH$_2$—CH$_2$—N(R$^2$)$_2$. At one or more occurrences, at least one group selected from R$^1$, R$^2$, and R$^3$ in the silane-functionalized PEI clay stabilizer molecule can be a silicon-containing group. Each amine group can be independently in the form of a neutral amine or a protonated cationic amine. Various embodiments provide a clay stabilizer composition including the silane-functionalized PEI clay stabilizer.

Various embodiments provide a silane-functionalized PEI clay stabilizer for treatment of a subterranean formation, wherein the silane-functionalized PEI clay stabilizer has the structure:

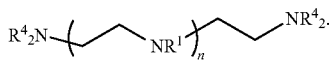

Each amine group is independently in the form of a neutral amine or a protonated cationic amine. At each occurrence, R$^1$ can be independently selected from the group consisting of —H, —CH$_2$—CH(OH)—(C$_1$-C$_8$)alkylene-O—(C$_1$-C$_{10}$)alkylene-Si(O—(C$_1$-C$_{10}$)alkyl)$_3$, and —CH$_2$—CH$_2$—N(R$^2$)$_2$, wherein at each occurrence, each (C$_1$-C$_{10}$)alkylene, (C$_1$-C$_8$)alkylene, and (C$_1$-C$_{10}$)alkyl is independently selected. At each occurrence, R$^2$ can be independently selected from the group consisting of —H, -L$^1$-Si—(R$^4$)$_3$, and —CH$_2$—CH$_2$—N(R$^3$)$_2$. At each occurrence, R$^3$ can be independently selected from the group consisting of —H, -L$^1$-Si—(R$^4$)$_3$, and —CH$_2$—CH$_2$—N(R$^2$)$_2$. At each occurrence, R$^4$ can be independently selected from the group consisting of —H and -L$^1$-Si—(R$^4$)$_3$. At one or more occurrences, at least one group selected from R$^1$, R$^2$, R$^3$, and R$^4$ in the silane-functionalized PEI clay stabilizer molecule can be a silicon-containing group. The variable n can be about 2 to about 1,000,000. Various embodiments provide a clay stabilizer composition including the silane-functionalized PEI clay stabilizer.

Method for Preparing a Clay Stabilizer or Composition Including the Same for Treatment of a Subterranean Formation.

In various embodiments, the present invention provides a method for preparing a silane-functionalized PAI clay stabilizer or clay stabilizer composition including the same for treatment of a subterranean formation. The method can be any suitable method that produces a silane-functionalized PAI clay stabilizer or clay stabilizer composition including the same described herein. In some embodiments, the method can include combining various components of the composition to form the clay stabilizer composition. In some embodiments, the method can include forming the silane-functionalized PAI clay stabilizer.

In some embodiments, the present invention provides a method of preparing a silane-functionalized PAI clay stabilizer for treatment of a subterranean formation. The method can include forming a mixture including a silane-functionalized epoxide and a PAI. The method can also include allowing the mixture to react to form the silane-functionalized PAI clay stabilizer. In some embodiments, the method can include forming a clay stabilizer composition including the silane-functionalized PAI clay stabilizer, such as by combining the silane-functionalized clay stabilizer to one or more other components to form the clay stabilizer composition.

The PAI can be a polymer including a repeating unit having the structure:

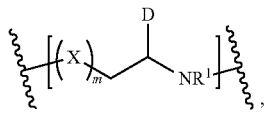

At each occurrence of R$^1$ and D in the same repeating unit, a) R$^1$ can be independently selected from the group consisting of —H and —(X)$_m$—CH$_2$—CHE-N(R$^2$)$_2$, and D is H, or b) R$^1$ and D together in the same repeating unit can form a (C$_1$-C$_{10}$)heterocycle with the N to which R$^1$ is bound. At each occurrence, X can be independently selected from the group consisting of —(CH$_2$)$_2$—O—, —(CH$_2$)$_3$—O—, —(CH$_2$)$_2$—S—, —(CH$_2$)$_3$—S—, and a —(C$_{1-10}$)alkylene-. At each occurrence, m can be about 0 to about 10. At each occurrence of R$^2$ and E in the same R$^1$ or in the same R$^3$, a) R$^2$ can be independently selected from the group consisting of —H and —(X)$_m$—CH$_2$—CHF—N(R$^3$)$_2$, and E is H, or b) R$^2$ and E together in the same R$^1$ or in the same R$^3$ can form a (C$_1$-C$_{10}$)heterocycle with the N to which R$^2$ is bound. At each occurrence of R$^3$ and F in the same R$^2$, a) R$^3$ can be independently selected from the group consisting of —H and —(X)$_m$—CH$_2$—CHE-N(R$^2$)$_2$, and F is H, or b) R$^3$ and F together in the same R$^2$ can form a (C$_1$-C$_{10}$)heterocycle with the N to which R$^3$ is bound. Each amine group is independently in the form of a neutral amine or a protonated cationic amine.

The silane-functionalized PAI clay stabilizer can have the structure:

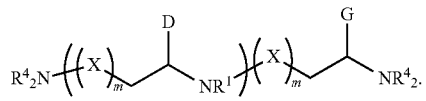

At each occurrence of R$^4$ in an end group not including G, R$^4$ can be independently selected from the group consisting of —H and -L$^1$-Si—(R$^4$)$_3$. At each occurrence of R$^4$ and G in the same end group, a) R$^4$ can be independently selected from the group consisting of —H and -L$^1$-Si—(R$^4$)$_3$ and G is H, or b) R$^4$ and G together in the same end group can form a (C$_1$-C$_{10}$)heterocycle with the N to which R$^4$ is bound. The variable n is about 2 to about 1,000,000, about 2 to about 1,000, about 2 to about 100, or about 2, or less than, equal to, or greater than 3, 4, 5, 6, 7, 8, 9, 10, 12, 14, 16, 18, 20, 22, 24, 26, 28, 30, 35, 40, 45, 50, 55, 60, 65, 70, 75, 80, 90, 100, 125, 150, 175, 200, 250, 300, 350, 400, 450, 500, 600, 700, 800, 900, 1,000, 1,500, 2,000, 2,500, 5,000, 10,000, 20,000, 50,000, 100,000, 500,000, or about 1,000,000 or more. Each amine group can be independently in the form of a neutral amine or a protonated cationic amine.

The PAI can be a PEI. The variable m can be 0. The variables D, E, F, and G can be H. The PEI can be a polymer including a repeating unit having the structure:

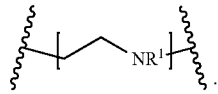

Each amine group is independently in the form of a neutral amine or a protonated cationic amine. At each occurrence, $R^1$ can be independently selected from the group consisting of —H and —$CH_2$—$CH_2$—$N(R^2)_2$. At each occurrence, $R^2$ can be independently selected from the group consisting of —H, and —$CH_2$—$CH_2$—$N(R^3)_2$. At each occurrence, $R^3$ can be independently selected from the group consisting of —H, and —$CH_2$—$CH_2$—$N(R^2)_2$. At one or more occurrences, at least one group selected from $R^1$, $R^2$, and $R^3$ in the silane-functionalized PEI clay stabilizer molecule can be a silicon-containing group.

The PAI can have the structure:

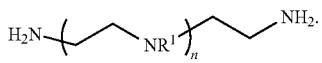

Each amine group is independently in the form of a neutral amine or a protonated cationic amine. The variable n is about 2 to about 1,000,000, about 2 to about 1,000, about 2 to about 100, or about 2, or less than, equal to, or greater than 3, 4, 5, 6, 7, 8, 9, 10, 12, 14, 16, 18, 20, 22, 24, 26, 28, 30, 35, 40, 45, 50, 55, 60, 65, 70, 75, 80, 90, 100, 125, 150, 175, 200, 250, 300, 350, 400, 450, 500, 600, 700, 800, 900, 1,000, 1,500, 2,000, 2,500, 5,000, 10,000, 20,000, 50,000, 100,000, 500,000, or about 1,000,000 or more.

The silane-functionalized epoxide can have the structure:

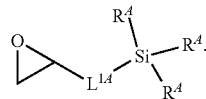

At each occurrence, $L^{1A}$ can be a substituted or unsubstituted ($C_1$-$C_{20}$)alkylene interrupted by —O—. At each occurrence, $R^A$ can be independently selected from —O—$R^B$, —H, and —$R^B$, wherein at least one $R^A$ of each —Si—$(R^A)_3$ is —O—$R^B$. At each occurrence, $R^B$ can be independently substituted or unsubstituted ($C_1$-$C_{20}$)hydrocarbyl. At each occurrence, $L^{1A}$ can independently have the structure -$L^{2A}$-O-$L^{3A}$-. At each occurrence, $L^{2A}$ can be independently a substituted or unsubstituted ($C_1$-$C_{10}$)alkylene. At each occurrence, $L^{2A}$ can be independently an unsubstituted ($C_1$-$C_5$)alkylene. At each occurrence, $L^{3A}$ can be independently a substituted or unsubstituted ($C_1$-$C_{10}$)alkylene. At each occurrence, $L^{3A}$ can be —$CH_2$—. The variable $L^{1A}$ can be:

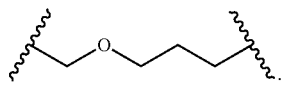 [SMILES: *CCCOC*]

The variable $R^A$ can be —O—$R^B$. At each occurrence, the variable $R^B$ can be independently ($C_1$-$C_{20}$)alkyl. At each occurrence, the variable $R^B$ can be independently ($C_1$-$C_8$) alkyl. The variable $R^B$ can be methyl. The silane-functionalized epoxide can have the structure:

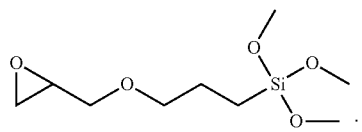

The molar ratio of the silane-functionalized epoxide to the number of PAI repeating groups in the PAI can be any suitable ratio, such as about 1:100,000 to about 100:1, about 2:1 to about 6:1, about 1:100,000 or less, or less than, equal to, or more than about 1:50,000, 1:10,000, 1:5,000, 1:2,500, 1:1,000, 1:500, 1:250, 1:100, 1:50, 1:25, 1:10, 1:8, 1:6, 1:4, 1:2, 1:1, 1.5:1, 2:1, 2.5:1, 3:1, 3.5:1, 4:1, 4.5:1, 5:1, 5.5:1, 6:1, 7:1, 8:1, 9:1, 10:1, 12:1, 14:1, 16:1, 20:1, 25:1, 50:1, 75:1, or about 100:1 or more.

The mixture including the silane-functionalized epoxide and the PAI can have any suitable pH during the reaction, such as about 6 to about 13, about 7 to about 12, about 8 to about 10, or about 6 or less, or less than, equal to, or more than about 6.5, 7, 7.5, 8, 8.5, 9, 9.5, 10, 10.5, 11, 11.5, 12, 12.5, or about 13 or more.

EXAMPLES

Various embodiments of the present invention can be better understood by reference to the following Examples which are offered by way of illustration. The present invention is not limited to the Examples given herein.

Example 1. Synthesis of Clay Stabilizer

An aqueous solution was prepared containing 1% v/v branched polyethyleneimine (PEI) (MW 800) by adding 1 mL of PEI at constant stirring and room temperature to a flask containing 100 mL of distilled water. The pH of the solution was adjusted to 9 using NaOH. Then, at room temperature, 1 mL of 3-glycidoxypropyltrimethoxysilane was added directly to the already prepared 100 mL of PEI solution, with shaking, to form a solution containing a silane-functionalized clay stabilizer. No purification or neutralization procedure was performed. The solution was freshly used for subsequent Examples.

Figure 3:
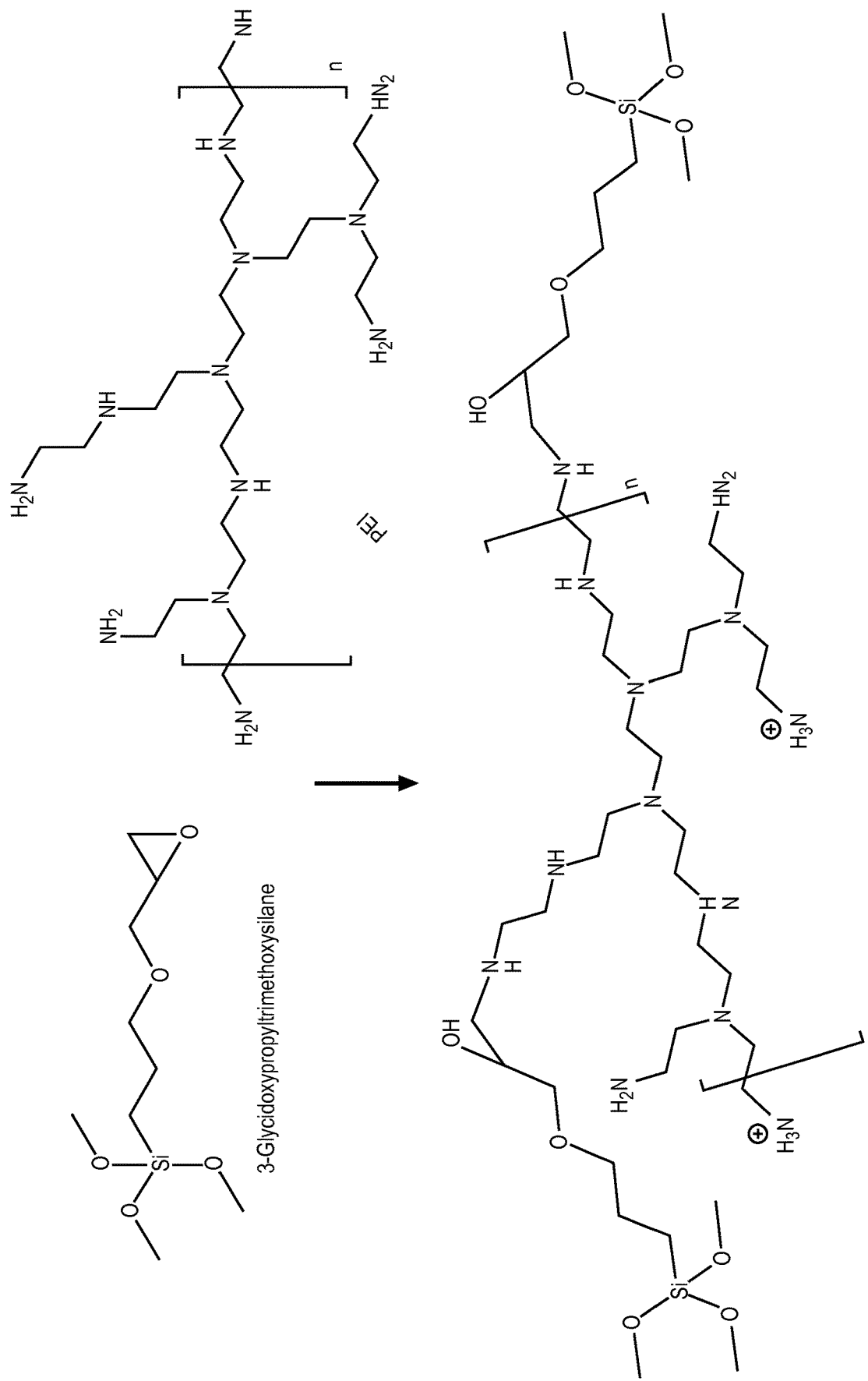
FIG. 3 illustrates a reaction of PEI with 3-glycidoxypropyltrimethoxysilane, in accordance with various embodiments.
Figure 4:
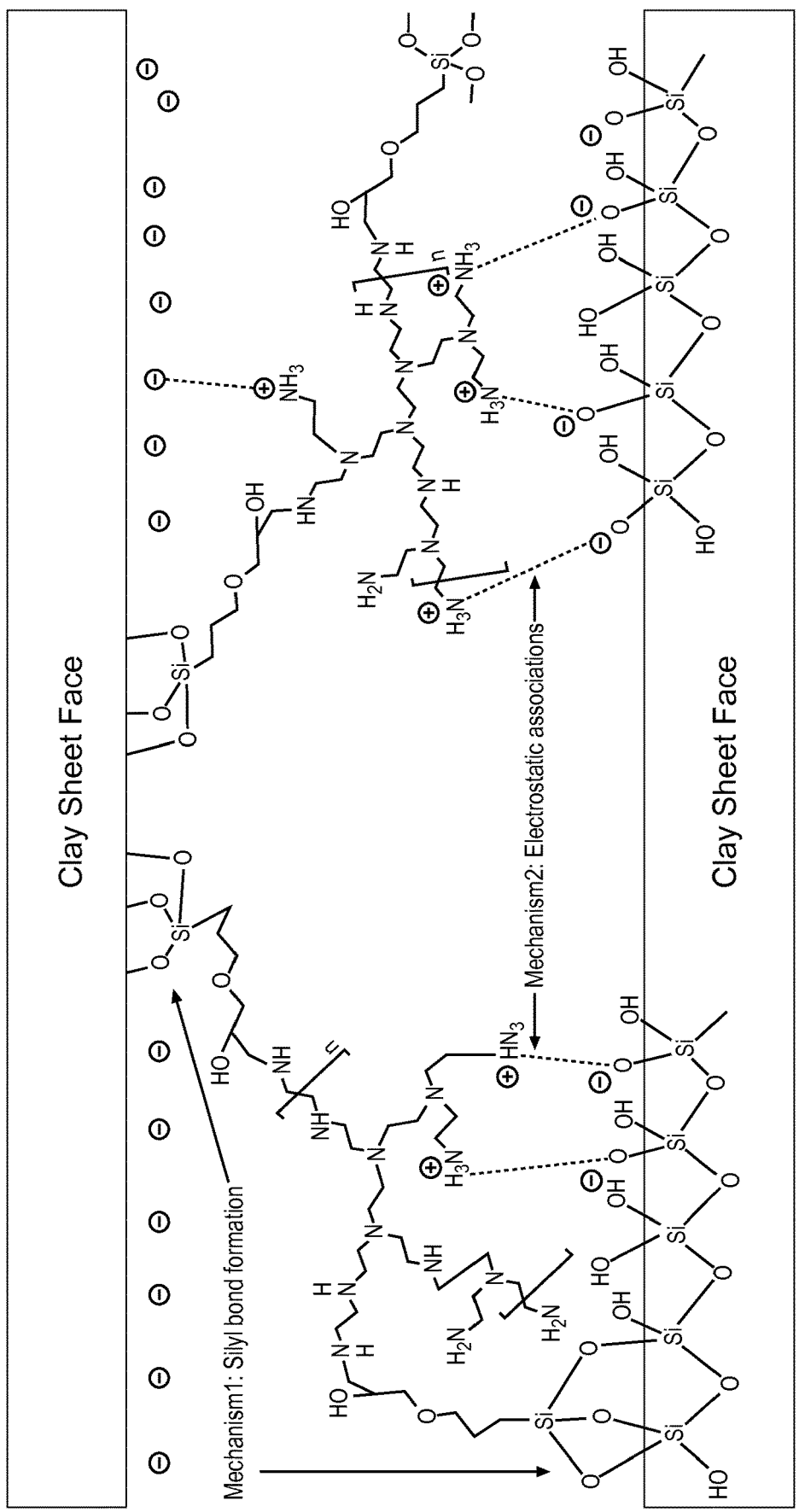
FIG. 4 illustrates proposed mechanisms for interaction of a silane-functionalized PEI clay stabilizer with clay surfaces, in accordance with various embodiments.

FIG. 3 illustrates a reaction scheme illustrating the reaction generally. FIG. 4 illustrates proposed electrostatic and covalent bonding mechanisms for interaction of the clay stabilizer with clay surfaces.

Example 2. Clay Stabilization Testing

Two conventional tests were performed: a fines generation test using 20% illite clay and a clay swelling test using 8% bentonite clay. Two conventional tests were performed: a fines generation test using 20% illite clay and a clay swelling test using 8% bentonite clay. The fines generation test rotated end-over-end a 20% illite sample in a fluid for 0, 10, and 120 minutes at 15 revolutions per minute. A light source was then used on the sample to determine the amount of suspended fine materials released from the illite sample due to migration. When a sample is exposed to different treatments, more or less fines are generated, resulting in a measurement of fines in the fluid sample. The clay swelling test (CST) used capillary suction time to determine the extent of swelling of an 8% bentonite clay sample in a fluid slurry after different treatments. A swelling sample has less free water and a lower permeability in the filter cake resulting in a longer CST time; when the sample is exposed to treatments that prevent clay swelling the CST will decrease.

Figure 5:
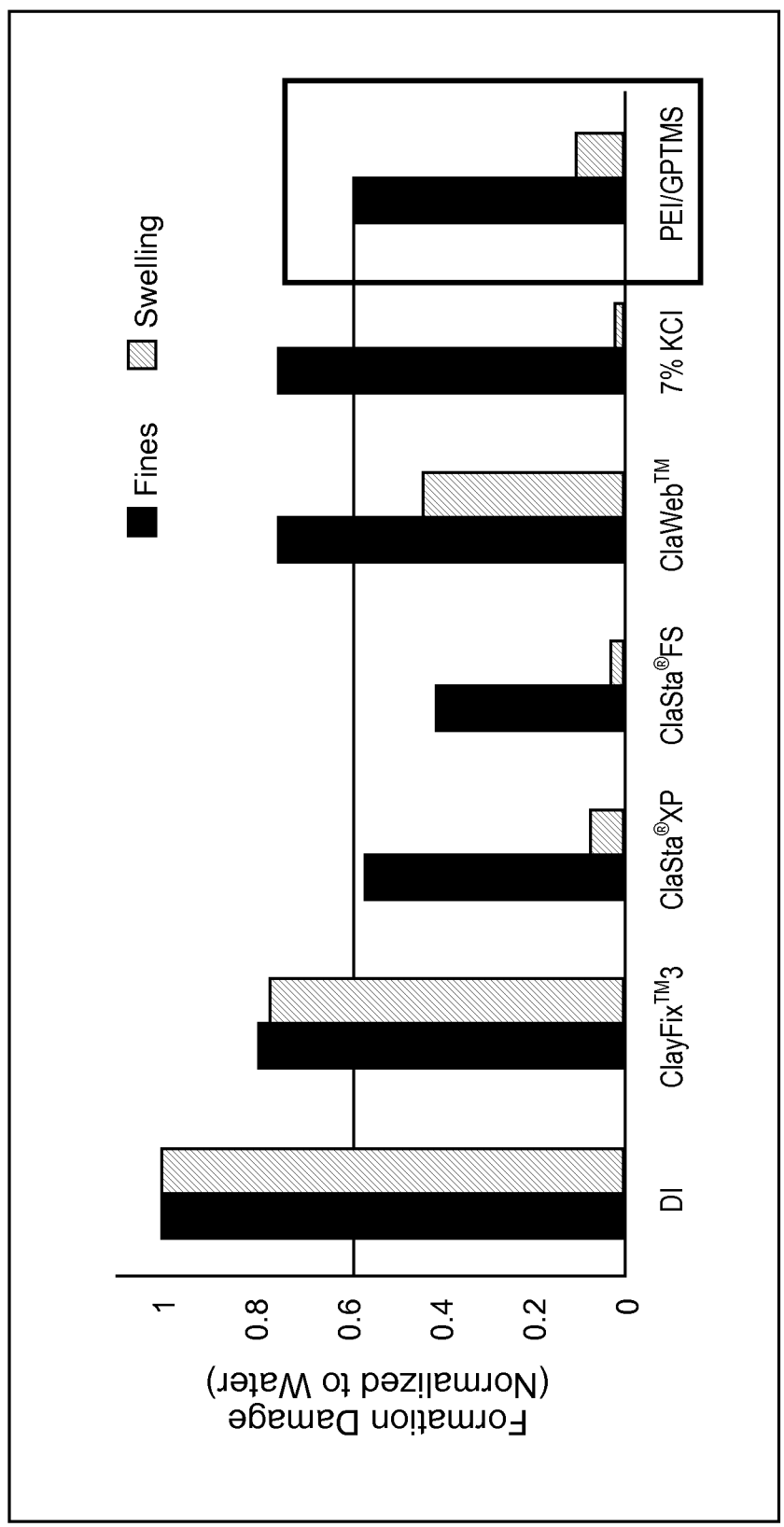
FIG. 5 illustrates the formation damage measured during a fines generation test and a clay swelling test for various clay stabilizers, in accordance with various embodiments.

The tests were performed using deionized water (DI), Clayfix™ 3, Cla-Sta® XP, Cla-Sta® FS, Cla-Web™, 7% KCl, and the clay stabilizer of Example 1 (0.5 wt % aqueous solution). The Clayfix™ 3, Cla-Sta® XP, Cla-Sta® FS, Cla-Web™ were used as 0.1 wt % aqueous solutions for the fines generation test, and as 0.01 wt % solutions for the clay swelling test. The 0.1 wt % of Cla-Sta® XP, Cla-Sta® FS, Cla-Web™ were saturated solutions that were expected to have the same effects in the fines generation test as solutions having higher concentrations of these products. The results of the tests are illustrated in FIG. 5. Lower numbers indicate better results. The clay stabilizer of Example 1 protected against fines generation better than 7% KCl, Clayfix™ 3, and Cla-Web™, and had similar protection to Cla-Sta® XP but with more expected permanency. Through modifications to the concentration, molecular weight, functionalization, or a combination thereof, the clay stabilizer of Example 1 could provide fines control, swelling control, or both, on-par or better than that provided by Cla-Sta® FS.

Based on the results, and the added permanency, the clay stabilizer of Example 1 is an effective solution for targeting fines control in fluid-sensitive formations.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in the subterranean formation a silane-functionalized polyalkyleneimine (PAI) clay stabilizer.

Embodiment 2 provides the method of Embodiment 1, wherein a clay stabilizer composition includes the silane-functionalized PAI clay stabilizer, wherein placing the silane-functionalized PAI clay stabilizer in the subterranean formation comprises placing the clay stabilizer composition in the subterranean formation.

Embodiment 3 provides the method of Embodiment 2, wherein the method further comprises obtaining or providing the composition, wherein the obtaining or providing of the composition occurs above-surface.

Embodiment 4 provides the method of any one of Embodiments 2-3, wherein the method further comprises obtaining or providing the composition, wherein the obtaining or providing of the composition occurs in the subterranean formation.

Embodiment 5 provides the method of any one of Embodiments 2-4, wherein at least one of prior to, during, and after the placing of the clay stabilizer composition in the subterranean formation, the clay stabilizer composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

Embodiment 6 provides the method of any one of Embodiments 2-5, further comprising combining the silane-functionalized PAI clay stabilizer with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form the clay stabilizer composition.

Embodiment 7 provides the method of any one of Embodiments 2-6, wherein the clay stabilizer composition is oil- or water-based.

Embodiment 8 provides the method of any one of Embodiments 2-7, wherein the clay stabilizer composition is a water- or oil-based emulsion.

Embodiment 9 provides the method of Embodiment 8, wherein the silane-functionalized PAI clay stabilizer is at least partially dissolved in the water-phase of the emulsion.

Embodiment 10 provides the method of any one of Embodiments 2-9, wherein the clay stabilizer composition comprises a carrier fluid.

Embodiment 11 provides the method of Embodiment 10, wherein the carrier fluid is about 0.001 wt % to about 99.999 wt % of the clay stabilizer composition.

Embodiment 12 provides the method of any one of Embodiments 10-11, wherein the carrier fluid is about 50 wt % to about 99.999 wt % of the clay stabilizer composition.

Embodiment 13 provides the method of any one of Embodiments 10-12, wherein the silane-functionalized PAI clay stabilizer is dispersed or dissolved in the carrier fluid.

Embodiment 14 provides the method of any one of Embodiments 1-13, wherein the silane-functionalized PAI clay stabilizer forms silyl bonds to clay in the subterranean formation.

Embodiment 15 provides the method of any one of Embodiments 1-14, wherein the silane-functionalized PAI clay stabilizer provides reduced clay swelling, reduced clay migration, reduced fines migration, or a combination thereof.

Embodiment 16 provides the method of any one of Embodiments 2-15, wherein the clay stabilizer composition provides reduced clay swelling, reduced clay migration, reduced fines migration, or a combination thereof, as compared to a corresponding composition free of the silane-functionalized PAI clay stabilizer or having less of the silane-functionalized PAI clay stabilizer therein.

Embodiment 17 provides the method of any one of Embodiments 2-16, wherein about 0.000.1 wt % to about 99.999 wt % of the composition is the clay stabilizer.

Embodiment 18 provides the method of any one of Embodiments 2-17, wherein about 0.001 wt % to about 10 wt % of the composition is the clay stabilizer.

Embodiment 19 provides the method of any one of Embodiments 1-18, wherein the PAI clay stabilizer is a polymer comprising a repeating unit having the following structure:

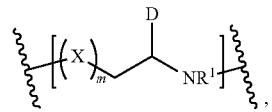

wherein at each occurrence of $R^1$ and D in the same repeating unit, $R^1$ is independently selected from the group consisting of —H, -$L^1$-Si—$(R^A)_3$, and —$(X)_m$—$CH_2$—CHE-N$(R^2)_2$, and D is H, or $R^1$ and D together in the same repeating unit form a $(C_1-C_{10})$heterocycle with the N to which $R^1$ is bound, at each occurrence, X is independently selected from the group consisting of —$(CH_2)_2$—O—, —$(CH_2)_3$—O—, —$(CH_2)_2$—S—, —$(CH_2)_3$—S—, and a —$(C_{1-10})$alkylene-, at each occurrence, m is about 0 to about 10, at each occurrence, $L^1$ is a substituted or unsubstituted $(C_1-C_{20})$hydrocarbylene interrupted by 0, 1, 2, or 3 groups independently selected from —O—, —S—, and substituted or unsubstituted —NH—, at each occurrence, $R^A$ is independently selected from —O—$R^B$, —H, and —$R^B$, wherein at least one $R^A$ of each —Si—$(R^A)_3$ is —O—$R^B$, at each occurrence, $R^B$ is independently substituted or unsubstituted $(C_1-C_{20})$hydrocarbyl, at each occurrence of $R^2$ and E in the same $R^1$ or in the same $R^3$, $R^2$ is independently selected from the group consisting of —H, -$L^1$-Si—$(R^A)_3$, and —$(X)_m$—$CH_2$—CHF—N$(R^3)_2$, and E is H, or $R^2$ and E together in the same $R^1$ or in the same $R^3$ form a $(C_1-C_{10})$heterocycle with the N to which $R^2$ is bound, at each occurrence of $R^3$ and F in the same $R^2$, $R^3$ is independently selected from the group consisting of —H, -$L^1$-Si—$(R^A)_3$, and —$(X)_m$—$CH_2$—CHE-N$(R^2)_2$, and F is H, or $R^3$ and F together in the same $R^2$ form a $(C_1-C_{10})$ heterocycle with the N to which $R^3$ is bound, at one or more occurrences, at least one group selected from $R^1$, $R^2$, and $R^3$ in the silane-functionalized PAI clay stabilizer molecule is a silicon-containing group, and each amine group is independently in the form of a neutral amine or a protonated cationic amine.

Embodiment 20 provides the method of Embodiment 19, wherein the silane-functionalized PAI clay stabilizer has the structure:

$$R^4{}_2N\left(\left(X\right)_m\right)_D\left(\left(X\right)_m\right)_G NR^4{}_2,$$

wherein at each occurrence of $R^4$ in an end group not including G, $R^4$ is independently selected from the group consisting of —H and -$L^1$-Si—$(R^A)_3$, at each occurrence of $R^4$ and G in the same end group, $R^4$ is independently selected from the group consisting of —H and -$L^1$-Si—$(R^A)_3$ and G is H, or $R^4$ and G together in the same end group form a $(C_1-C_{10})$ heterocycle with the N to which $R^4$ is bound, n is about 2 to about 1,000,000, and each amine group is independently in the form of a neutral amine or a protonated cationic amine.

Embodiment 21 provides the method of any one of Embodiments 19-20, wherein the silane-functionalized PAI clay stabilizer is a polyethyleneiminde (PEI) clay stabilizer, wherein at each occurrence m is 0, and D, E, and F are H, wherein the PEI clay stabilizer is a polymer comprising a repeating unit having the following structure:

$$\left\{\begin{array}{c}\\NR^1\end{array}\right\},$$

wherein at each occurrence, $R^1$ is independently selected from the group consisting of —H, -$L^1$-Si—$(R^A)_3$, and —$CH_2$—$CH_2$—N$(R^2)_2$, at each occurrence, $L^1$ is a substituted or unsubstituted $(C_1-C_{20})$hydrocarbylene interrupted by 0, 1, 2, or 3 groups independently selected from —O—, —S—, and substituted or unsubstituted —NH—, at each occurrence, $R^A$ is independently selected from —O—$R^B$, —H, and —$R^B$, wherein at least one $R^A$ of each —Si—$(R^A)_3$ is —O—$R^B$, at each occurrence, $R^B$ is independently substituted or unsubstituted $(C_1-C_{20})$hydrocarbyl, at each occurrence, $R^2$ is independently selected from the group consisting of —H, -$L^1$-Si—$(R^A)_3$, and —$CH_2$—$CH_2$—N$(R^3)_2$, at each occurrence, $R^3$ is independently selected from the group consisting of —H, -$L^1$-Si—$(R^A)_3$, and —$CH_2$—$CH_2$—N$(R^2)_2$, at one or more occurrences, at least one group selected from $R^1$, $R^2$, and $R^3$ in the silane-functionalized PEI clay stabilizer molecule is a silicon-containing group, and each amine group is independently in the form of a neutral amine or a protonated cationic amine.

Embodiment 22 provides the method of any one of Embodiments 19-21, wherein the silane-functionalized PEI clay stabilizer has the structure:

$$R^4{}_2N\left(\underset{NR^1}{\underbrace{\phantom{XXX}}}\right)_n NR^4{}_2,$$

wherein at each occurrence, $R^4$ is independently selected from the group consisting of —H and -$L^1$-Si—$(R^A)_3$, n is about 2 to about 1,000,000, and each amine group is independently in the form of a neutral amine or a protonated cationic amine.

Embodiment 23 provides the method of any one of Embodiments 20-22, wherein n is about 2 to about 1,000.

Embodiment 24 provides the method of any one of Embodiments 20-23, wherein n is about 2 to about 100.

Embodiment 25 provides the method of any one of Embodiments 19-24, wherein at each occurrence, $L^1$ is a substituted or unsubstituted $(C_1-C_{20})$alkylene interrupted by —O—.

Embodiment 26 provides the method of any one of Embodiments 19-25, wherein at each occurrence, $L^1$ independently has the structure -$L^2$-O-$L^3$-.

Embodiment 27 provides the method of Embodiment 26, wherein at each occurrence, $L^2$ is independently substituted or unsubstituted $(C_1-C_{10})$alkylene.

Embodiment 28 provides the method of any one of Embodiments 26-27, wherein at each occurrence, $L^2$ is independently unsubstituted $(C_1-C_5)$alkylene.

Embodiment 29 provides the method of any one of Embodiments 26-28, wherein at each occurrence, $L^3$ is independently substituted or unsubstituted $(C_1-C_{10})$alkylene.

Embodiment 30 provides the method of any one of Embodiments 26-29, wherein at each occurrence, $L^3$ is independently a hydroxy-substituted $(C_1-C_{10})$alkylene.

Embodiment 31 provides the method of any one of Embodiments 26-30, wherein at each occurrence, $L^3$ is independently $-(C_1-C_8)$alkylene-CH(OH)-CH$_2$-, wherein the hydroxy group is on the carbon beta to the amine.

Embodiment 32 provides the method of any one of Embodiments 26-31, wherein $L^3$ is $-CH_2-CH(OH)-CH_2-$.

Embodiment 33 provides the method of any one of Embodiments 26-32, wherein $L^1$ is $-(CH_2)_3-O-CH_2-CH(OH)-CH_2-$, wherein the hydroxy group is on the carbon beta to the amine.

Embodiment 34 provides the method of any one of Embodiments 19-33, wherein $R^A$ is $-O-R^B$.

Embodiment 35 provides the method of any one of Embodiments 19-34, wherein at each occurrence, $R^B$ is independently $(C_1-C_{20})$alkyl.

Embodiment 36 provides the method of any one of Embodiments 19-35, wherein at each occurrence, $R^B$ is independently $(C_1-C_5)$alkyl.

Embodiment 37 provides the method of any one of Embodiments 19-36, wherein $R^B$ is methyl.

Embodiment 38 provides the method of any one of Embodiments 26-37, wherein $-L^1-Si-(R^A)_3$ is $-CH_2-CH(OH)-CH_2-O-(CH_2)_3-Si(OCH_3)_3$.

Embodiment 39 provides the method of any one of Embodiments 19-38, wherein the ratio of the number of $-L^1-Si-(R^A)_3$ groups in the silane-functionalized PAI to the number of times the repeating group repeats is about 1:100,000 to about 100:1.

Embodiment 40 provides the method of any one of Embodiments 19-39, wherein the ratio of the number of $-L^1-Si-(R^A)_3$ groups in the silane-functionalized PAI to the number of times the repeating group repeats is about 2:1 to about 6:1.

Embodiment 41 provides the method of any one of Embodiments 20-40, wherein the ratio of the number of $-L^1-Si-(R^A)_3$ groups in the silane-functionalized PAI to n is about 1:100,000 to about 100:1.

Embodiment 42 provides the method of any one of Embodiments 20-41, wherein the ratio of the number of $-L^1-Si-(R^A)_3$ groups in the silane-functionalized PAI to n is about 2:1 to about 6:1.

Embodiment 43 provides the method of any one of Embodiments 1-42, wherein the silane-functionalized PAI clay stabilizer has the structure:

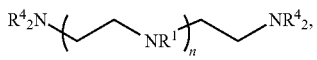

wherein at each occurrence, $R^1$ is independently selected from the group consisting of $-H$, $-CH_2-CH(OH)-(C_1-C_8)$alkylene-O-$(C_1-C_{10})$alkylene-Si(O-$(C_1-C_{10})$alkyl)$_3$, and $-CH_2-CH_2-N(R^2)_2$, at each occurrence, $R^2$ is independently selected from the group consisting of $-H$, $-CH_2-CH(OH)-(C_1-C_8)$alkylene-O-$(C_1-C_{10})$alkylene-Si(O-$(C_1-C_{10})$alkyl)$_3$, and $-CH_2-CH_2-N(R^3)_2$, at each occurrence, $R^3$ is independently selected from the group consisting of $-H$, $-CH_2-CH(OH)-(C_1-C_8)$alkylene-O-$(C_1-C_{10})$alkylene-Si(O-$(C_1-C_{10})$alkyl)$_3$, and $-CH_2-CH_2-N(R^2)_2$, at each occurrence, $R^4$ is independently selected from the group consisting of $-H$ and $-CH_2-CH(OH)-(C_1-C_8)$alkylene-O-$(C_1-C_{10})$alkylene-Si(O-$(C_1-C_{10})$alkyl)$_3$, at one or more occurrences, at least one group selected from $R^1$, $R^2$, $R^3$, and $R^4$ in the silane-functionalized PEI clay stabilizer molecule is a silicon-containing group, at each occurrence, each $(C_1-C_{10})$alkylene, $(C_1-C_8)$alkylene, and $(C_1-C_{10})$alkyl is independently selected, n is about 2 to about 1,000,000, and each amine group is independently in the form of a neutral amine or a protonated cationic amine.

Embodiment 44 provides the method of any one of Embodiments 1-43, wherein the silane-functionalized PAI clay stabilizer has the structure:

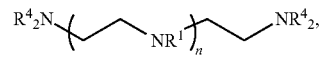

wherein at each occurrence, $R^1$ is independently selected from the group consisting of $-H$, $-CH_2-CH(OH)-CH_2-O-(CH_2)_3-Si(OCH_3)_3$, and $-CH_2-CH_2-N(R^2)_2$, at each occurrence, $R^2$ is independently selected from the group consisting of $-H$, $-CH_2-CH(OH)-CH_2-O-(CH_2)_3-Si(OCH_3)_3$, and $-CH_2-CH_2-N(R^3)_2$, at each occurrence, $R^3$ is independently selected from the group consisting of $-H$, $-CH_2-CH(OH)-CH_2-O-(CH_2)_3-Si(OCH_3)_3$, and $-CH_2-CH_2-N(R^2)_2$, at each occurrence, $R^4$ is independently selected from the group consisting of $-H$ and $-CH_2-CH(OH)-CH_2-O-(CH_2)_3-Si(OCH_3)_3$, at one or more occurrences, at least one group selected from $R^1$, $R^2$, $R^3$, and $R^4$ in the silane-functionalized PEI clay stabilizer molecule is a silicon-containing group, n is about 2 to about 1,000,000, and each amine group is independently in the form of a neutral amine or a protonated cationic amine.

Embodiment 45 provides the method of any one of Embodiments 2-44, wherein the composition further comprises a secondary clay stabilizer.

Embodiment 46 provides the method of Embodiment 45, wherein the secondary clay stabilizer is potassium chloride, a non-polymeric ionic liquid, an inorganic phosphate, a polyalkoxy diamine or a salt thereof, choline or a choline derivative, an oligomethylene diamine or a salt thereof, an addition product of carboxymethyl cellulose and an organic amine, 1,2-cyclohexanediamine or a salt thereof, a salt of a phosphoric acid ester of an oxyalkylated polyol, a combination of a partially hydrolyzed acrylic copolymer potassium chloride and polyanionic cellulose, a quaternary ammonium compound, a polymer based on dialkyl aminoalkyl methacrylate, an aqueous solution containing a polymer with hydrophilic and hydrophobic groups, a reaction product of a polyhydroxyalkane and an alkylene oxide, or a combination thereof.

Embodiment 47 provides the method of any one of Embodiments 2-46, wherein the clay stabilizer composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 48 provides the method of any one of Embodiments 2-47, wherein the placing of the clay stabilizer composition in the subterranean formation comprises fracturing at least part of the subterranean formation to form at least one subterranean fracture.

Embodiment 49 provides the method of any one of Embodiments 2-48, wherein the clay stabilizer composition further comprises a proppant, a resin-coated proppant, or a combination thereof.

Embodiment 50 provides the method of any one of Embodiments 2-49, wherein the placing of the clay stabilizer composition in the subterranean formation comprises pumping the composition through a tubular disposed in a wellbore and into the subterranean formation.

Embodiment 51 provides the method of any one of Embodiments 2-50, wherein the placing of the clay stabilizer composition in the subterranean formation comprises pumping the composition through a drill string disposed in a wellbore, through a drill bit at a downhole end of the drill string, and back above-surface through an annulus.

Embodiment 52 provides the method of Embodiment 51, further comprising processing the composition exiting the annulus with at least one fluid processing unit to generate a cleaned composition and recirculating the cleaned composition through the wellbore.

Embodiment 53 provides a system for performing the method of any one of Embodiments 2-52, the system comprising:
a tubular disposed in the subterranean formation; and
a pump configured to pump the clay stabilizer composition in the subterranean formation through the tubular.

Embodiment 54 provides a system for performing the method of any one of Embodiments 2-53, the system comprising:
a drill string disposed in a wellbore, the drill string comprising a drill bit at a downhole end of the drill string;
an annulus between the drill string and the wellbore; and
a pump configured to circulate the clay stabilizer composition through the drill string, through the drill bit, and back above-surface through the annulus.

Embodiment 55 provides a method of treating a subterranean formation, the method comprising:
placing in the subterranean formation a silane-functionalized polyalkyleneimine (PAI) clay stabilizer, wherein the silane-functionalized PAI clay stabilizer is a polymer comprising a repeating unit having the following structure:

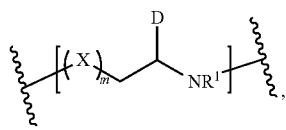

wherein
at each occurrence of $R^1$ and D in the same repeating unit,
$R^1$ is independently selected from the group consisting of —H, -$L^1$-Si—$(R^4)_3$, and —$(X)_m$—$CH_2$—CHE-N$(R^2)_2$, and D is H, or
$R^1$ and D together in the same repeating unit form a $(C_1$-$C_{10})$heterocycle with the N to which $R^1$ is bound,
at each occurrence, X is independently selected from the group consisting of —$(CH_2)_2$—O—, —$(CH_2)_3$—O—, —$(CH_2)_2$—S—, —$(CH_2)_3$—S—, and a —$(C_{1-10})$alkylene-,
at each occurrence, m is about 0 to about 10,
at each occurrence, $L^1$ is a substituted or unsubstituted $(C_1$-$C_{20})$hydrocarbylene interrupted by 0, 1, 2, or 3 groups independently selected from —O—, —S—, and substituted or unsubstituted —NH—,
at each occurrence, $R^A$ is independently selected from —O—$R^B$, —H, and —$R^B$, wherein at least one $R^A$ of each —Si—$(R^A)_3$ is —O—$R^B$,
at each occurrence, $R^B$ is independently substituted or unsubstituted $(C_1$-$C_{20})$hydrocarbyl,
at each occurrence of $R^2$ and E in the same $R^1$ or in the same $R^3$,
$R^2$ is independently selected from the group consisting of —H, -$L^1$-Si—$(R^4)_3$, and —$(X)_m$—$CH_2$—CHF—N$(R^3)_2$, and E is H, or
$R^2$ and E together in the same $R^1$ or in the same $R^3$ form a $(C_1$-$C_{10})$heterocycle with the N to which $R^2$ is bound,
at each occurrence of $R^3$ and F in the same $R^2$,
$R^3$ is independently selected from the group consisting of —H, -$L^1$-Si—$(R^4)_3$, and —$(X)_m$—$CH_2$—CHE-N$(R^2)_2$, and F is H, or
$R^3$ and F together in the same $R^2$ form a $(C_1$-$C_{10})$ heterocycle with the N to which $R^3$ is bound,
at one or more occurrences, at least one group selected from $R^1$, $R^2$, and $R^3$ in the silane-functionalized PAI clay stabilizer molecule is a silicon-containing group, and each amine group is independently in the form of a neutral amine or a protonated cationic amine.

Embodiment 56 provides a method of treating a subterranean formation, the method comprising:
placing in the subterranean formation a silane-functionalized polyethyleneimine (PEI) clay stabilizer, wherein the silane-functionalized PEI clay stabilizer is a polymer comprising a repeating unit having the following structure:

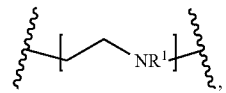

wherein
at each occurrence, $R^1$ is independently selected from the group consisting of —H, -$L^1$-Si—$(R^4)_3$, and —$CH_2$—$CH_2$—N$(R^2)_2$,
at each occurrence, $L^1$ is a substituted or unsubstituted $(C_1$-$C_{20})$hydrocarbylene interrupted by 0, 1, 2, or 3 groups independently selected from —O—, —S—, and substituted or unsubstituted —NH—,
at each occurrence, $R^A$ is independently selected from —O—$R^B$, —H, and —$R^B$, wherein at least one $R^A$ of each —Si—$(R^A)_3$ is —O—$R^B$,
at each occurrence, $R^B$ is independently substituted or unsubstituted $(C_1$-$C_{20})$hydrocarbyl,
at each occurrence, $R^2$ is independently selected from the group consisting of —H, -$L^1$-Si—$(R^4)_3$, and —$CH_2$—$CH_2$—N$(R^3)_2$, at each occurrence, $R^3$ is independently selected from the group consisting of —H, -$L^1$-Si—($R^A$)$_3$, and —CH$_2$—CH$_2$—N($R^2$)$_2$, and at one or more occurrences, at least one group selected from $R^1$, $R^2$, and $R^3$ in the silane-functionalized PEI clay stabilizer molecule is a silicon-containing group, each amine group is independently in the form of a neutral amine or a protonated cationic amine.

Embodiment 57 provides a system comprising:

a tubular disposed in a subterranean formation; and a pump configured to pump a clay stabilizer composition comprising a silane-functionalized polyalkyleneimine (PAI) clay stabilizer in the subterranean formation through the tubular.

Embodiment 58 provides the system of Embodiment 57, wherein the tubular comprises a drill string disposed in a wellbore, the drill string comprising a drill bit at a downhole end of the drill string; and the system comprises an annulus between the drill string and the wellbore;

wherein the pump is configured to circulate the clay stabilizer composition through the drill string, through the drill bit, and back above-surface through the annulus.

Embodiment 59 provides the system of any one of Embodiments 57-58, further comprising a fluid processing unit configured to process the composition exiting the annulus to generate a cleaned drilling fluid for recirculation through the wellbore.

Embodiment 60 provides a silane-functionalized polyalkyleneimine (PAI) clay stabilizer for treatment of a subterranean formation.

Embodiment 61 provides a silane-functionalized polyalkyleneimine (PAI) clay stabilizer for treatment of a subterranean formation, wherein the silane-functionalized PAI clay stabilizer is a polymer comprising a repeating unit having the following structure:

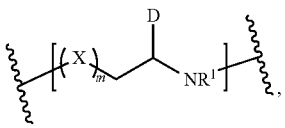

wherein at each occurrence of $R^1$ and D in the same repeating unit, $R^1$ is independently selected from the group consisting of —H, -$L^1$-Si—($R^A$)$_3$, and —(X)$_m$—CH$_2$—CHE-N($R^2$)$_2$, and D is H, or $R^1$ and D together in the same repeating unit form a ($C_1$-$C_{10}$)heterocycle with the N to which $R^1$ is bound, at each occurrence, X is independently selected from the group consisting of —(CH$_2$)$_2$—O—, —(CH$_2$)$_3$—O—, —(CH$_2$)$_2$—S—, —(CH$_2$)$_3$—S—, and a —($C_{1-10}$)alkylene-, at each occurrence, m is about 0 to about 10, at each occurrence, $L^1$ is a substituted or unsubstituted ($C_1$-$C_{20}$)hydrocarbylene interrupted by 0, 1, 2, or 3 groups independently selected from —O—, —S—, and substituted or unsubstituted —NH—, at each occurrence, $R^A$ is independently selected from —O—$R^B$, —H, and —$R^B$, wherein at least one $R^A$ of each —Si—($R^A$)$_3$ is —O—$R^B$, at each occurrence, $R^B$ is independently substituted or unsubstituted ($C_1$-$C_{20}$)hydrocarbyl, at each occurrence of $R^2$ and E in the same $R^1$ or in the same $R^3$, $R^2$ is independently selected from the group consisting of —H, -$L^1$-Si—($R^A$)$_3$, and —(X)$_m$—CH$_2$—CHF—N($R^3$)$_2$, and E is H, or $R^2$ and E together in the same $R^1$ or in the same $R^3$ form a ($C_1$-$C_{10}$)heterocycle with the N to which $R^2$ is bound, at each occurrence of $R^3$ and F in the same $R^2$, $R^3$ is independently selected from the group consisting of —H, -$L^1$-Si—($R^A$)$_3$, and —(X)$_m$—CH$_2$—CHE-N($R^2$)$_2$, and F is H, or $R^3$ and F together in the same $R^2$ form a ($C_1$-$C_{10}$) heterocycle with the N to which $R^3$ is bound, at one or more occurrences, at least one group selected from $R^1$, $R^2$, and $R^3$ in the silane-functionalized PAI clay stabilizer molecule is a silicon-containing group, and each amine group is independently in the form of a neutral amine or a protonated cationic amine.

Embodiment 62 provides a composition comprising the clay stabilizer of Embodiment 61.

Embodiment 63 provides a silane-functionalized polyethyleneimine (PEI) clay stabilizer for treatment of a subterranean formation.

Embodiment 64 provides a silane-functionalized polyethyleneimine (PEI) clay stabilizer for treatment of a subterranean formation, wherein the silane-functionalized PEI clay stabilizer is a polymer comprising a repeating unit having the following structure:

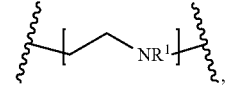

wherein at each occurrence, $R^1$ is independently selected from the group consisting of —H, -$L^1$-Si—($R^A$)$_3$, and —CH$_2$—CH$_2$—N($R^2$)$_2$, at each occurrence, $L^1$ is a substituted or unsubstituted ($C_1$-$C_{20}$)hydrocarbylene interrupted by 0, 1, 2, or 3 groups independently selected from —O—, —S—, and substituted or unsubstituted —NH—, at each occurrence, $R^A$ is independently selected from —O—$R^B$, —H, and —$R^B$, wherein at least one $R^A$ of each —Si—($R^A$)$_3$ is —O—$R^B$, at each occurrence, $R^B$ is independently substituted or unsubstituted ($C_1$-$C_{20}$)hydrocarbyl, at each occurrence, $R^2$ is independently selected from the group consisting of —H, -$L^1$-Si—($R^A$)$_3$, and —CH$_2$—CH$_2$—N($R^3$)$_2$, at each occurrence, $R^3$ is independently selected from the group consisting of —H, -$L^1$-Si—($R^A$)$_3$, and —CH$_2$—CH$_2$—N($R^2$)$_2$, at one or more occurrences, at least one group selected from $R^1$, $R^2$, and $R^3$ in the silane-functionalized clay stabilizer PEI molecule is a silicon-containing group, and each amine group is independently in the form of a neutral amine or a protonated cationic amine.

Embodiment 65 provides a composition comprising the clay stabilizer of Embodiment 64.

Embodiment 66 provides a silane-functionalized polyethyleneimine (PEI) clay stabilizer for treatment of a subterranean formation, wherein the silane-functionalized PEI clay stabilizer has the structure:

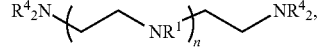

wherein at each occurrence, $R^1$ is independently selected from the group consisting of —H, —CH$_2$—CH(OH)—(C$_1$-C$_8$)alkylene-O—(C$_1$-C$_{10}$)alkylene-Si(O—(C$_1$-C$_{10}$)alkyl)$_3$, and —CH$_2$—CH$_2$—N(R$^2$)$_2$, wherein at each occurrence, each (C$_1$-C$_{10}$)alkylene, (C$_1$-C$_8$)alkylene, and (C$_1$-C$_{10}$)alkyl is independently selected, at each occurrence, $R^2$ is independently selected from the group consisting of —H, -L$^1$-Si—(R$^A$)$_3$, and —CH$_2$—CH$_2$—N(R$^3$)$_2$, at each occurrence, $R^3$ is independently selected from the group consisting of —H, -L$^1$-Si—(R$^A$)$_3$, and —CH$_2$—CH$_2$—N(R$^2$)$_2$, at each occurrence, $R^4$ is independently selected from the group consisting of —H and -L$^1$-Si—(R$^A$)$_3$, at one or more occurrences, at least one group selected from $R^1$, $R^2$, $R^3$, and $R^4$ in the silane-functionalized clay stabilizer PEI molecule is a silicon-containing group, n is about 2 to about 1,000,000, and each amine group is independently in the form of a neutral amine or a protonated cationic amine.

Embodiment 67 provides a composition comprising the clay stabilizer of Embodiment 66.

Embodiment 68 provides a method of preparing a silane-functionalized polyalkyleneimine (PAI) clay stabilizer for treatment of a subterranean formation, the method comprising:

forming a mixture comprising a silane-functionalized epoxide and a PAI; and allowing the mixture to react to form the silane-functionalized PAI clay stabilizer.

Embodiment 69 provides the method of Embodiment 68, further comprising forming a clay stabilizer composition comprising the silane-functionalized PAI clay stabilizer.

Embodiment 70 provides the method of any one of Embodiments 68-69, wherein the PAI is a polymer comprising a repeating unit having the structure:

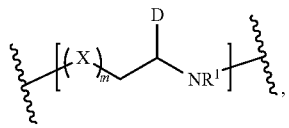

wherein at each occurrence of $R^1$ and D in the same repeating unit, $R^1$ is independently selected from the group consisting of —H and —(X)$_m$—CH$_2$—CHE-N(R$^2$)$_2$, and D is H, or $R^1$ and D together in the same repeating unit form a (C$_1$-C$_{10}$)heterocycle with the N to which $R^1$ is bound, at each occurrence, X is independently selected from the group consisting of —(CH$_2$)$_2$—O—, —(CH$_2$)$_3$—O—, —(CH$_2$)$_2$—S—, —(CH$_2$)$_3$—S—, and a —(C$_{1-10}$)alkylene-, at each occurrence, m is about 0 to about 10, at each occurrence of $R^2$ and E in the same $R^1$ or in the same $R^3$, $R^2$ is independently selected from the group consisting of —H and —(X)$_m$—CH$_2$—CHF—N(R$^3$)$_2$, and E is H, or $R^2$ and E together in the same $R^1$ or in the same $R^3$ form a (C$_1$-C$_{10}$)heterocycle with the N to which $R^2$ is bound, at each occurrence of $R^3$ and F in the same $R^2$, $R^3$ is independently selected from the group consisting of —H and —(X)$_m$—CH$_2$—CHE-N(R$^2$)$_2$, and F is H, or $R^3$ and F together in the same $R^2$ form a (C$_1$-C$_{10}$) heterocycle with the N to which $R^3$ is bound, and each amine group is independently in the form of a neutral amine or a protonated cationic amine.

Embodiment 71 provides the method of Embodiment 70, wherein the PAI is PEI, wherein m is 0, D, E, and F are H, and wherein the PAI is a polymer comprising a repeating unit having the structure:

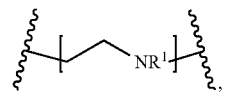

wherein at each occurrence, $R^1$ is independently selected from the group consisting of —H and —CH$_2$—CH$_2$—N(R$^2$)$_2$, at each occurrence, $R^2$ is independently selected from the group consisting of —H, and —CH$_2$—CH$_2$—N(R$^3$)$_2$, at each occurrence, $R^3$ is independently selected from the group consisting of —H, and —CH$_2$—CH$_2$—N(R$^2$)$_2$, and each amine group is independently in the form of a neutral amine or a protonated cationic amine.

Embodiment 72 provides the method of Embodiment 71, wherein the PEI has the structure:

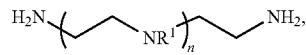

wherein n is about 2 to about 1,000,000, and each amine group is independently in the form of a neutral amine or a protonated cationic amine.

Embodiment 73 provides the method of Embodiment 72, wherein n is about 2 to about 1,000.

Embodiment 74 provides the method of any one of Embodiments 72-73, wherein n is about 2 to about 100.

Embodiment 75 provides the method of any one of Embodiments 68-74, wherein the silane-functionalized epoxide has the structure:

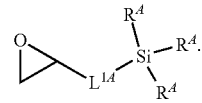

wherein at each occurrence, $L^{1A}$ is a substituted or unsubstituted (C$_1$-C$_{20}$)alkylene interrupted by —O—, at each occurrence, $R^A$ is independently selected from —O—R$^B$, —H, and —R$^B$, wherein at least one $R^A$ of each —Si—(R$^A$)$_3$ is —O—R$^B$, and at each occurrence, $R^B$ is independently substituted or unsubstituted (C$_1$-C$_{20}$)hydrocarbyl.

Embodiment 76 provides the method of Embodiment 75, wherein at each occurrence, $L^{1A}$ independently has the structure -L$^{2A}$-O-L$^{3A}$-.

Embodiment 77 provides the method of Embodiment 76, wherein at each occurrence, $L^{2A}$ is independently substituted or unsubstituted (C$_1$-C$_{10}$)alkylene.

Embodiment 78 provides the method of any one of Embodiments 76-77, wherein at each occurrence, $L^{2A}$ is independently unsubstituted (C$_1$-C$_5$)alkylene.

Embodiment 79 provides the method of any one of Embodiments 76-78, wherein at each occurrence, $L^{3A}$ is independently a substituted or unsubstituted (C$_1$-C$_{10}$)alkylene.

Embodiment 80 provides the method of any one of Embodiments 76-79, wherein $L^{34}$ is —CH$_2$—.

Embodiment 81 provides the method of any one of Embodiments 76-80, wherein $L^{14}$ is:

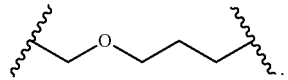 [SMILES: *CCCOC*]

Embodiment 82 provides the method of any one of Embodiments 75-81, wherein $R^A$ is —O—$R^B$.

Embodiment 83 provides the method of any one of Embodiments 75-82, wherein at each occurrence, $R^B$ is independently (C$_1$-C$_{20}$)alkyl.

Embodiment 84 provides the method of any one of Embodiments 75-83, wherein at each occurrence, $R^B$ is independently (C$_1$-C$_5$)alkyl.

Embodiment 85 provides the method of any one of Embodiments 75-84, wherein $R^B$ is methyl.

Embodiment 86 provides the method of any one of Embodiments 68-85, wherein the silane-functionalized epoxide has the structure:

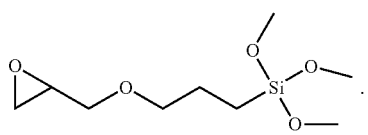

Embodiment 87 provides the method of any one of Embodiments 68-86, wherein the molar ratio of the silane-functionalized epoxide to the PEI is about 1:100,000 to about 100:1.

Embodiment 88 provides the method of any one of Embodiments 68-87, wherein the molar ratio of the silane-functionalized epoxide to the PEI is about 2:1 to about 6:1.

Embodiment 89 provides the method of any one of Embodiments 68-88, wherein the pH of the mixture is about 7 to about 12.

Embodiment 90 provides the method of any one of Embodiments 68-89, wherein the pH of the mixture is about 8 to about 10.

Embodiment 91 provides the method, system, or composition of any one or any combination of Embodiments 1-90 optionally configured such that all elements or options recited are available to use or select from.

What is claimed is:

1. A method of treating a subterranean clay formation, the method comprising:
   placing in the subterranean clay formation a clay stabilizer composition comprising a silane-functionalized polyalkyleneimine (PAI) clay stabilizer; and
   stabilizing a clay of the formation with the clay stabilizer composition against clay swelling, clay migration, and fines generation in the subterranean formation via covalent silyl bond formation and electrostatic interaction between the clay and the silane-functionalized PAI clay stabilizer.

2. The method of claim 1, further comprising combining the silane-functionalized PAI clay stabilizer with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form the clay stabilizer composition.

3. The method of claim 1, wherein the clay stabilizer composition comprises about 0.001 wt % to about 99.999 wt %, based on the total weight of the clay stabilizer composition, of a carrier fluid.

4. The method of claim 1, wherein about 0.0001 wt % to about 99.999 wt % of the composition is the clay stabilizer.

5. The method of claim 1, wherein the PAI clay stabilizer is a polymer comprising a repeating unit having the following structure:

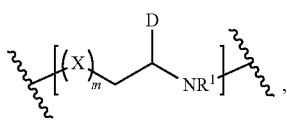

wherein
at each occurrence of $R^1$ and D in the same repeating unit,
$R^1$ is independently selected from the group consisting of —H, -$L^1$-Si—($R^A$)$_3$, and —(X)$_m$—CH$_2$—CHE-N($R^2$)$_2$, and D is H, or
$R^1$ and D together in the same repeating unit form a (C$_1$-C$_{10}$)heterocycle with the N to which $R^1$ is bound,
at each occurrence, X is independently selected from the group consisting of —(CH$_2$)$_2$—O—, —(CH$_2$)$_3$—O—, —(CH$_2$)$_2$S—, —(CH$_2$)$_3$—S—, and a —(C$_{1-10}$)alkylene-,
at each occurrence, m is about 0 to about 10,
at each occurrence, $L_1$ is a substituted or unsubstituted (C$_1$-C$_{20}$)hydrocarbylene interrupted by 0, 1, 2, or 3 groups independently selected from —O—, —S—, and substituted or unsubstituted —NH—,
at each occurrence, $R^A$ is independently selected from —O—$R^b$, —H, and —$R^B$, wherein at least one $R^A$ of each —Si—($R^A$)$_3$ is —O—$R^B$,
at each occurrence, $R^B$ is independently substituted or unsubstituted (C$_1$-C$_{20}$)hydrocarbyl,
at each occurrence of $R^2$ and E in the same $R^1$ or in the same $R^3$,
$R^2$ is independently selected from the group consisting of —H, -$L^1$-Si—($R^A$)$_3$, and —(X)$_m$—CH$_2$—CHF-N($R^3$)$_2$, and E is H, or
$R^2$ and E together in the same $R^1$ or in the same $R^3$ form a (C$_1$-C$_{10}$)heterocycle with the N to which $R^2$ is bound,
at each occurrence of $R^3$ and F in the same $R^2$,
$R^3$ is independently selected from the group consisting of —H, —$L^1$-Si—($R^A$)$_3$, and —(X)$_m$—CH$_2$—CHE-N($R^2$)$_2$, and F is H, or
$R^3$ and F together in the same $R^2$ form a (C$_1$-C$_{10}$) heterocycle with the N to which $R^3$ is bound,
at one or more occurrences, at least one group selected from $R^1$, $R^2$, and $R^3$ in the silane-functionalized PAI clay stabilizer molecule is a silicon-containing group, and
each amine group is independently in the form of a neutral amine or a protonated cationic amine.

6. The method of claim 5, wherein the silane-functionalized PAI clay stabilizer has the structure:

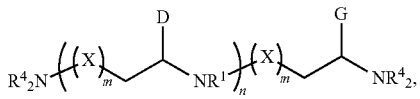

wherein
at each occurrence of $R^4$ in an end group not including G, $R^4$ is independently selected from the group consisting of —H and —$L^1$-Si—$(R^A)_3$,
at each occurrence of $R^4$ and G in the same end group, $R^4$ is independently selected from the group consisting of —H and —$L^1$-Si—$(R^A)_3$ and G is H, or
$R^4$ and G together in the same end group form a $(C_1$-$C_{10})$heterocycle with the N to which $R^4$ is bound,
n is about 2 to about 1,000,000, and
each amine group is independently in the form of a neutral amine or a protonated cationic amine.

7. The method of claim 5, wherein the silane-functionalized PAI clay stabilizer is a polyethyleneimine (PEI) clay stabilizer, wherein at each occurrence m is 0, and D, E, and F are H, wherein the PEI clay stabilizer is a polymer comprising a repeating unit having the following structure:

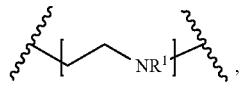

wherein
at each occurrence, $R^1$ is independently selected from the group consisting of —H, —$L^1$-Si—$(R^A)_3$, and —$CH_2$—$CH_2$-$N(R^2)_2$,
at each occurrence, $L^1$ is a substituted or unsubstituted $(C_1$-$C_{20})$hydrocarbylene interrupted by 0, 1, 2, or 3 groups independently selected from —O—, —S—, and substituted or unsubstituted —NH—,
at each occurrence, $R^A$ is independently selected from —O—$R^B$, —H, and —$R^B$, wherein at least one $R^A$ of each —Si—$(R^A)_3$ is —O—$R^B$,
at each occurrence, $R^B$ is independently substituted or unsubstituted $(C_1$-$C_{20})$hydrocarbyl,
at each occurrence, $R^2$ is independently selected from the group consisting of —H, —$L^1$-Si—$(R^A)_3$, and —$CH_2$—$CH_2$-$N(R^3)_2$,
at each occurrence, $R^3$ is independently selected from the group consisting of —H, —$L^1$-Si—$(R^A)_3$, and —$CH_2$—$CH_2$-$N(R^2)_2$,
at one or more occurrences, at least one group selected from $R^1$, $R^2$, and $R^3$ in the silane-functionalized PAI clay stabilizer molecule is a silicon-containing group, and
each amine group is independently in the form of a neutral amine or a protonated cationic amine.

8. The method of claim 5, wherein the silane-functionalized PAI clay stabilizer has the structure:

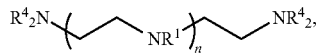

wherein
at each occurrence, $R^4$ is independently selected from the group consisting of —H and —$L^1$-Si—$(R^A)_3$,
n is about 2 to about 1,000,000, and
each amine group is independently in the form of a neutral amine or a protonated cationic amine.

9. The method of claim 1, wherein the silane-functionalized PAI clay stabilizer has the structure:

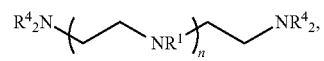

wherein
at each occurrence, $R^1$ is independently selected from the group consisting of —H, —$CH_2$—CH(OH)—$(C_1$-$C_8)$alkylene-O—$(C_1$-$C_{10})$alkylene-Si(O—$(C_1$-$C_{10})$alkyl)$_3$, and —$CH_2$—$CH_2$—$N(R^2)_2$,
at each occurrence, $R^2$ is independently selected from the group consisting of —H, —$CH_2$—CH(OH)—$(C_1$-$C_8)$alkylene-O—$(C_1$-$C_{10})$alkylene-Si(O—$(C_1$-$C_{10})$alkyl)$_3$, and —$CH_2$—$CH_2$—$N(R^3)_2$,
at each occurrence, $R^3$ is independently selected from the group consisting of —H, —$CH_2$—CH(OH)—$(C_1$-$C_8)$alkylene-O—$(C_1$-$C_{10})$alkylene-Si(O—$(C_1$-$C_{10})$alkyl)$_3$, and —$CH_2$—$CH_2$—$N(R^2)_2$,
at each occurrence, $R^4$ is independently selected from the group consisting of —H, —$CH_2$—CH(OH)—$(C_1$-$C_8)$alkylene-O—$(C_1$-$C_{10})$alkylene-Si(O—$(C_1$-$C_{10})$alkyl)$_3$,
at one or more occurrences, at least one group selected from $R^1$, $R^2$, $R^3$, and $R^4$ in the silane-functionalized PAI clay stabilizer molecule is a silicon-containing group,
at each occurrence, each $(C_1$-$C_{10})$alkylene, $(C_1$-$C_8)$ alkylene, and $(C_1$-$C_{10})$alkyl is independently selected,
n is about 2 to about 1,000,000, and
each amine group is independently in the form of a neutral amine or a protonated cationic amine.

10. The method of claim 1, wherein the silane-functionalized PAI clay stabilizer has the structure:

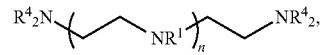

wherein
at each occurrence, $R^1$ is independently selected from the group consisting of —H, —$CH_2$—CH(OH)—$CH_2$—O—$(CH_2)_3$—Si(OCH$_3$)$_3$, and —$CH_2$—$CH_2$—$N(R^2)_2$,
at each occurrence, $R^2$ is independently selected from the group consisting of —H, —$CH_2$—CH(OH)—$CH_2$—O—$(CH_2)_3$—Si(OCH$_3$)$_3$, and —$CH_2$—$CH_2$—$N(R^2)_2$,
at each occurrence, $R^3$ is independently selected from the group consisting of —H, —$CH_2$—CH(OH)—$CH_2$—O—$(CH_2)_3$—Si(OCH$_3$)$_3$, and —$CH_2$—$CH_2$—$N(R^2)_2$,
at each occurrence, $R^4$ is independently selected from the group consisting of —H and —$CH_2$—CH(OH)—$CH_2$—O—$(CH_2)_3$—Si(OCH$_3$)$_3$, at one or more occurrences, at least one group selected from $R^1$, $R^2$, $R^3$, and $R^4$ in the silane-functionalized PAI clay stabilizer molecule is a silicon-containing group, n is about 2 to about 1,000,000, and each amine group is independently in the form of a neutral amine or a protonated cationic amine.

11. The method of claim 1, further comprising preparing the silane-functionalized PAI clay stabilizer by:

forming a mixture comprising a silane-functionalized epoxide and a PAI; and allowing the mixture to react to form the silane-functionalized PAI clay stabilizer.

* * * * *